United States Patent
Suzuki

(10) Patent No.: US 8,281,365 B2
(45) Date of Patent: Oct. 2, 2012

(54) INFORMATION MANAGEMENT METHOD, INFORMATION MANAGEMENT SYSTEM, COMPUTER-READABLE MEDIUM AND COMPUTER DATA SIGNAL

(75) Inventor: Noriaki Suzuki, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 589 days.

(21) Appl. No.: 12/486,338

(22) Filed: Jun. 17, 2009

(65) Prior Publication Data

US 2010/0058439 A1 Mar. 4, 2010

(30) Foreign Application Priority Data

Aug. 29, 2008 (JP) .................................. 2008-222116

(51) Int. Cl.
*H04L 29/00* (2006.01)
(52) U.S. Cl. ............ 726/2; 726/3; 726/4; 726/5; 726/6; 726/7; 726/8; 726/9; 726/10
(58) Field of Classification Search ................. 726/3–10
See application file for complete search history.

(56) References Cited

U.S. PATENT DOCUMENTS

| | | | |
|---|---|---|---|
| 2005/0044167 A1* | 2/2005 | Kobayashi et al. | 709/217 |
| 2006/0005256 A1* | 1/2006 | Cox | 726/27 |
| 2009/0205020 A1 | 8/2009 | Kazama et al. | |

FOREIGN PATENT DOCUMENTS

| | | |
|---|---|---|
| JP | 2001-051902 A | 2/2001 |
| JP | 2002-202956 A | 7/2002 |
| JP | 2004-062780 A | 2/2004 |
| JP | 2006-106986 A | 4/2006 |
| JP | 2006-235895 A | 9/2006 |
| JP | 2006-330846 A | 12/2006 |
| JP | 3921865 B2 | 3/2007 |
| JP | 2007-334384 A | 12/2007 |
| JP | 2008-052647 A | 3/2008 |
| JP | 4122042 B1 | 5/2008 |
| JP | 2009-187341 A | 8/2009 |

OTHER PUBLICATIONS

Japanese Office Action issued for Application No. 2008-222116, dated Jun 29, 2010.

* cited by examiner

*Primary Examiner* — Mohammad W Reza
*Assistant Examiner* — Ghazal Shehni
(74) *Attorney, Agent, or Firm* — Sughrue Mion, PLLC

(57) ABSTRACT

An information management method includes: receiving a request for certain operation of certain electronic information associated with operation right information that defines permitted operation for each user; determining as to whether or not at least one of (i) a history of previous operations, executed by the user, of the certain electronic information and (ii) a history of previous operations, executed by the user, of a location associated with the certain electronic information meets a predetermined condition, and if it is determined that the at least one of (i) the history of previous operations, executed by the user, of the certain electronic information and (ii) the history of previous operations, executed by the user, of the location associated with the certain electronic information meets the predetermined condition, starting to execute the certain operation.

20 Claims, 20 Drawing Sheets

FIG. 11

| objectID 1110 | Operator 1120 | Operation date/time 1130 | Description of operation 1140 | Management information 1150 | Miscellaneous attribute information 1160 |
|---|---|---|---|---|---|
| 100001 | UserA | 2007/02/15 10:08:42 | Registration (parent) | .. | .. |
| 100111 | UserA | 2007/02/15 10:10:42 | Registration (itself) | .. | .. |
| 100111 | UserB | 2007/02/15 10:12:42 | Change (itself) | .. | .. |
| 100001 | UserA | .. | Delete (parent) | .. | .. |
| 100111 | UserC | | Delete (itself) | .. | .. |
| .. | .. | | | | |

| vRoleID | Virtual role name | Create date/time | Change date/time | Miscellaneous attribute information |
|---|---|---|---|---|
| 200001 | Person in charge | 2007/02/15 10:12:42 | 2007/02/15 10:12:42 | : |
| 200002 | Predecessor | 2007/02/15 10:08:42 | 2007/02/15 10:08:42 | : |
| 200003 | Responsible person of group in charge | 2007/03/16 11:28:52 | 2007/03/16 11:28:52 | : |
| 200004 | Member of group in charge | 2007/02/15 10:10:42 | 2007/02/15 10:10:42 | : |
| 200005 | New member of group in charge | 2007/02/15 10:12:42 | 2007/02/15 10:12:42 | : |
| 200006 | Old member of group in charge | 2007/02/25 13:12:42 | 2007/02/15 10:12:42 | : |
| 200007 | Person in charge of parent folder | 2007/02/28 10:20:42 | 2007/02/28 10:20:42 | : |
| : | : | | | : |

FIG. 13 (Part 1)

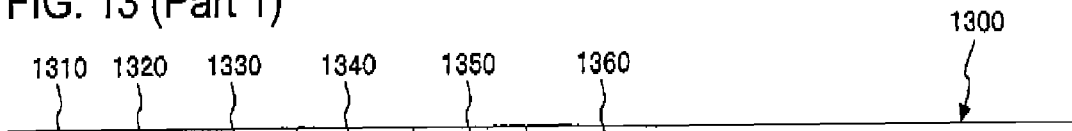

| vRoleID | Order | Target concatenation | Extraction target | Condition concatenation | Condition |
|---|---|---|---|---|---|
| 200001 | 1 | | | | USER = currentOperator |
| 200001 | 2 | | USER | | Object.productName IN userDef.productName |
| 200002 | 1 | | | | USER = currentOperator |
| 200002 | 2 | | USER | | HISTORY.operationUser |
| 200002 | 3 | | HISTORY | | ObjectHistory.operationDate > (nowDate - 1:month) |
| 200002 | 4 | | | AND | ObjectHistory.operationUser = currentOperator |
| 200002 | 5 | AND | | | USER = currentOperator |
| 200002 | 6 | | USER | | Object.productName NOT IN userDef.productName |
| 200003 | 1 | | | | USER = currentOperator |
| 200003 | 2 | | USER | | GROUP.manager |
| 200003 | 3 | | GROUP | | GROUP IN MEMBER USER |
| 200003 | 4 | | USER | | Document.productName IN userDef.productName |
| 200004 | 1 | | | | GROUP IN MEMBER currentOperator |
| 200004 | 2 | | GROUP | | GROUP IN MEMBER USER |
| 200004 | 3 | | USER | | Document.productName IN userDef.productName |
| 200005 | 1 | | | | GROUP IN MEMBER currentOperator |
| 200005 | 2 | | GROUP | | GROUP IN MEMBER USER |
| 200005 | 3 | | USER | | Document.productName IN userDef.productName |
| 200005 | 4 | AND | | | USER != currentOperator |
| 200005 | 5 | | USER | | HISTORY.operationUser |
| 200005 | 6 | | HISTORY | | ObjectHistory.operationDate < (nowDate - 1:month) |
| 200005 | 7 | | | AND | ObjectHistory.operationUser = currentOperator |

(Continued next page)

FIG. 13 (Part 2) (continued)

| | | | | | |
|---|---|---|---|---|---|
| 200006 | 1 | | | | GROUP NOT IN MEMBER currentOperator |
| 200006 | 2 | | GROUP | | GROUP IN MEMBER USER |
| 200006 | 3 | | USER | | Document.productName IN userDef.productName |
| 200006 | 4 | AND | | | USER = currentOperator |
| 200006 | 5 | | USER | | HISTORY.operationUser |
| 200006 | 6 | | HISTORY | | ObjectHistory.operationDate > (nowDate - 1:month) |
| 200006 | 7 | | | AND | ObjectHistory.operationUser = currentOperator |
| 200007 | 1 | | | | USER = currentOperator |
| 200007 | 2 | | USER | | HISTORY.operationUser |
| 200007 | 3 | | HISTORY | | OBJECT.ObjectHistory.operationDate>(nowDate-1:month) |
| 200007 | 4 | | OBJECT | | OBJECT.parent |
| 200007 | 5 | | OBJECT | | Document.parent |
| 200007 | 6 | | | AND | OBJECT.ObjectHistory.operationUser=currentOperator |
| 200007 | 7 | | OBJECT | | OBJECT.parent |
| 200007 | 8 | | OBJECT | | Document.parent |

FIG. 18

| User ID | User name | Product name 1 | Product name 2 | Product name 3 | Creation date | Last update date | Miscellaneous attribute information |
|---|---|---|---|---|---|---|---|
| 300001 | User A | Product B | Product C | Product E | 20080101 | 20080601 | ... |
| 300002 | User B | Product A | Product D | Product F | 20080101 | 20080701 | ... |
| 300003 | User C | Product G | Product H | Product I | 20080401 | 20080701 | ... |
| ... | ... | ... | ... | ... | ... | ... | ... |
| ... | ... | ... | ... | ... | ... | ... | ... |

| Group ID | Group name | User name 1 | User name 2 | User name 3 | Creation date | Last update date | Miscellaneous attribute information |
|---|---|---|---|---|---|---|---|
| 400001 | Group X | User B | User C | User E | 20080401 | 20080601 | ... |
| 400002 | Dept. Y | User A | User D | User F | 20080401 | 20080701 | ... |
| ... | ... | ... | ... | ... | ... | ... | ... |
| ... | ... | ... | ... | ... | ... | ... | ... |

| Object ID (2010) | Object name (2020) | Product name (2030) | Creator (2040) | Creation date (2050) | Last update date (2060) | Last update person (2070) | Miscellaneous attribute information (2080) |
|---|---|---|---|---|---|---|---|
| 100001 | ABC.doc | Product A | User A | 20080101 | 20080601 | User B | ... |
| 100002 | Doc2.doc | Product B | User B | 20080101 | 20080701 | User A | ... |
| 100003 | XYZ.xls | Product C | User F | 20080401 | 20080701 | User F | ... |
| ... | ... | ... | ... | ... | ... | ... | ... |
| ... | ... | ... | ... | ... | ... | ... | ... |

INFORMATION MANAGEMENT METHOD, INFORMATION MANAGEMENT SYSTEM, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-222116 filed on Aug. 29, 2008.

BACKGROUND

1. Technical Field

This invention relates to an information management method, an information management system, a computer-readable medium and a computer data signal.

2. Related Art

There has been known an information management system for controlling operation, by a user, of electronic information in response to operation right information that defines for each user operation permitted for electronic information.

SUMMARY

According to an aspect of the invention, an information management method includes: receiving a request for certain operation of certain electronic information associated with operation right information that defines permitted operation for each user; determining, based on the operation right associated with the certain electronic information, as to whether or not it is permitted for a user who is a request source of the certain operation to execute the certain operation; if it is determined that the user is permitted to execute the certain operation, starting to execute the certain operation; determining as to whether or not at least one of (i) a history of previous operations, executed by the user, of the certain electronic information and (ii) a history of previous operations, executed by the user, of a location associated with the certain electronic information meets a predetermined condition; and if it is determined that the at least one of (i) the history of previous operations, executed by the user, of the certain electronic information and (ii) the history of previous operations, executed by the user, of the location associated with the certain electronic information meets the predetermined condition, starting to execute the certain operation.

BRIEF DESCRIPTION OF THE DRAWINGS

Exemplary embodiments of the invention will be described in detail based on the following figures, wherein:

FIG. 11 is a schematic representation showing an example of a data structure of an operation history storage table;

FIG. 12 is a schematic representation showing an example of a data structure of a virtual role information storage table;

FIG. 13 is a schematic representation showing an example of a data structure of a virtual role condition storage table;

FIG. 18 is a schematic representation showing an example of a data structure of user attributes stored in a user information storage module;

FIG. 19 is a schematic representation showing an example of a data structure of group attributes stored in the user information storage module; and FIG. 20 is a schematic representation showing an example of a data structure of document attributes (object attributes) stored in a document information storage module.

DETAILED DESCRIPTION

Referring now to the accompanying drawings, exemplary embodiment of the invention will be described below.

Figure 1:
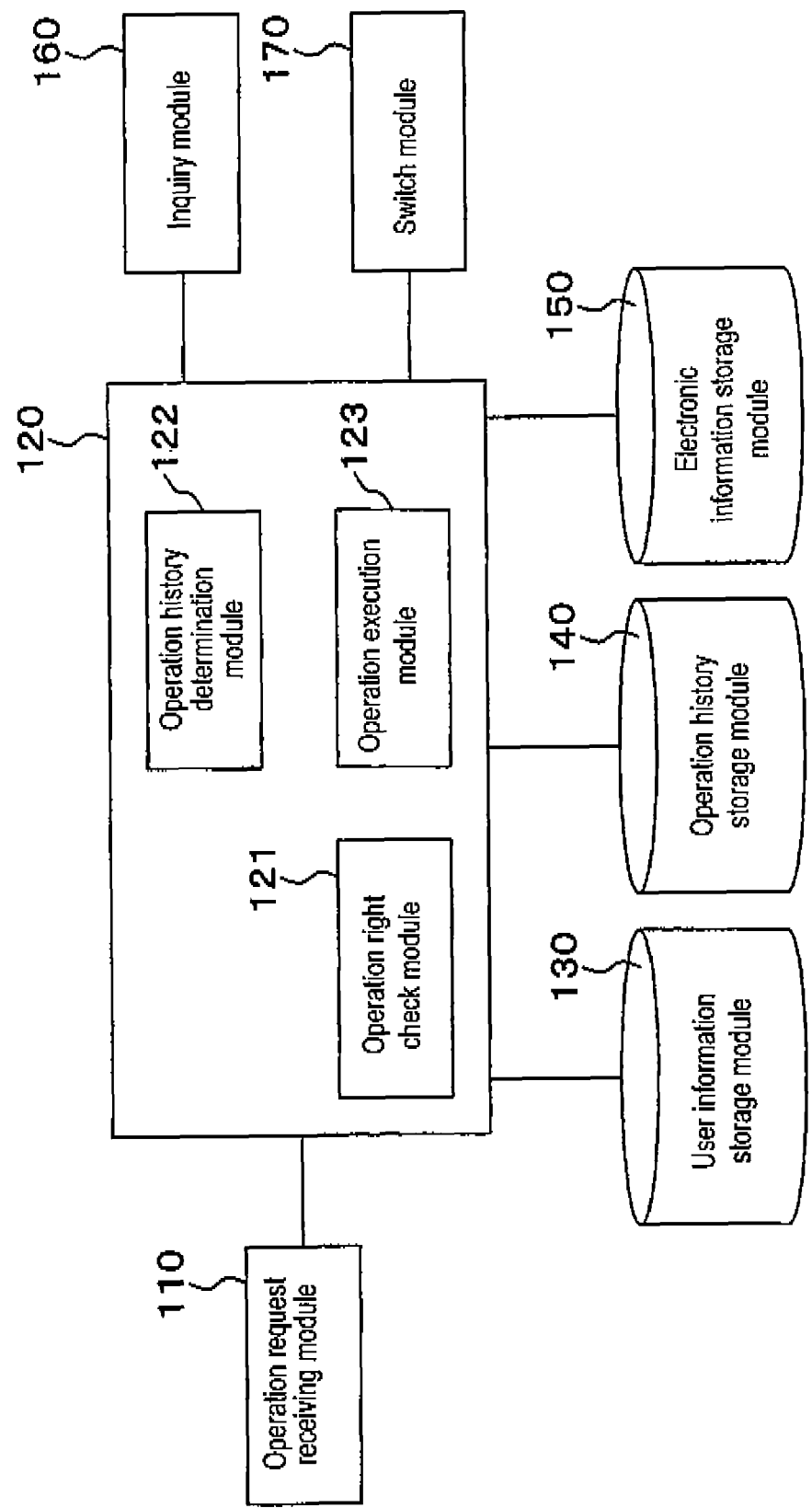
FIG. 1 is a conceptual module block diagram showing a configuration example of an exemplary embodiment of the invention.

FIG. 1 is a conceptual module block diagram showing a configuration example of an exemplary embodiment of the invention.

A module refers to a generally and logically detachable component of software (computer program), hardware, etc. Thus, the term "module" in the exemplary embodiment means not only a module in a computer program, but also a module in the hardware configuration. Therefore, the exemplary embodiment also serves as description of a computer program, a system, and a method. For the convenience of the description, "store", "cause to store" and its equivalent word are used. However, if the exemplary embodiment is a computer program, those words are used to mean storing in storage or controlling so as to store in storage. Modules are almost in a one-to-one correspondence with functions; however, in implementation, one module may be one program, or two or more modules may make up one program, or two or more programs may make up one module. Two or more modules may be executed by one computer or one module may be executed in two or more computers in a distributed or parallel environment. One module may contain any other module. In the following description, the term "connection" contains not only physical connection, but also logical connection (data transfer, command, reference relationship between data pieces, etc.).

The system or apparatus is not only provided by connecting plural computers, hardware devices, units, etc., by a communication line such as a network (containing peer-to-peer communication connection), etc., but also implemented as one computer, hardware device, apparatus, etc. The words "apparatus" and "system" are used as synonymous with each other. The word "predetermined" refers to a timing, a situation, a state, etc., before a target process; it is used to mean "determined" in response to the situation, the state, etc., at that time or in response to the situation, the state, etc., so far even after the process according to the exemplary embodiment is started, not only before the process according to the exemplary embodiment is started. The "access" refers to reading data from or writing data into storage (which contains memory, etc., and is not necessarily in a computer) in the computer.

In the following description, a document is illustrated mainly as electronic information. The "document" is electronic data of text or electronic data of an image, a moving image, a sound, etc., in some cases. The "document" is a unit of a structure given a name, can be stored, edited, and retrieved, can be exchanged as an individual unit between systems or between users. The "document" includes ones similar to the above examples. Specific examples of the "document" include a document and an electronic mail, etc., that are created using document creation software. An association location (may be simply referred to as a "location") that is associated with a document to be operated is configured as a logical location used to classify documents, etc.; for example, the "association location" is a folder, a directory, etc. In the following description, a folder is mainly illustrated.

A "tree structure of electronic information" refers to a structure in which a document is contained in a folder in the document example described above. In this case, the folder falls under electronic information located in a parent node of the document. The folder may be contained in another folder that is located in a further ancestor node of the document. Therefore, a folder located in an ancestor node of the document may be not only the folder located in the parent node of the document, but also the folder located in a further ancestor node of the document.

In the description of the exemplary embodiment, a user serves as an operator, a user, an approver, a requester, etc., in response to the situation.

In the following description, an access right is illustrated mainly as an operation right.

As shown in FIG. 1, the exemplary embodiment has an operation request receiving module 110, a right/operation processing module 120, a user information storage module 130, an operation history storage module 140, an electronic information storage module 150, an inquiry module 160, and a switch module 170. The right/operation processing module 120 has an operation right check module 121, an operation history determination module 122, and an operation execution module 123.

The operation request receiving module 110 is connected to the right/operation processing module 120. The operation request receiving module 110 receives a request for operation of electronic information that is associated with operation right information. The operation request receiving module 110 passes the received request to the right/operation processing module 120. The operation right information is information that defines permitted operation of electronic information for each user. Therefore, the expression "a user has an operation right" is used to mean a state in which if the user attempts to operate electronic information, the operation is permitted.

The right/operation processing module 120 is connected to the operation request receiving module 110, the user information storage module 130, the operation history storage module 140, the electronic information storage module 150, the inquiry module 160, and the switch module 170. The right/operation processing module 120 receives the request from the operation request receiving module 110, controls the operation right check module 121, the operation history determination module 122, and the operation execution module 123 in accordance with the request, and determines as to whether or not give a permission for the operation to the user who makes the request. If the operation is permitted, the right/operation processing module 120 executes the operation. The right/operation processing module 120 may execute the operation in accordance with a command from the inquiry module 160 or the switch module 170.

The operation right check module 121 accesses the user information storage module 130 and checks as to whether or not the request-source user has an operation right for performing the operation for the electronic information to be operated, in accordance with the operation right information associated with the electronic information. For example, specifically, the operation right check module 121 checks as to whether or not the user has an access right corresponding to the operation, such as a read right, a write right, and an execution right for the document. If the operation right check module 121 confirms that the user has the operation right, the operation execution module 123 executes the operation. If the operation right check module 121 confirms that the user does not have the operation right, control is transferred to a determination process performed by the operation history determination module 122.

If the operation right check module 121 determines that the user does not have the operation right, the operation history determination module 122 determines as to whether or not the history of previous operations, executed by the user, of the electronic information or the history of previous operations, executed by the user, of the association location associated with the electronic information, which are stored in the operation history storage module 140, satisfies a predetermined condition. If it is determined that the condition is satisfied, the operation execution module 123 executes the operation. If it is determined that the condition is not satisfied, error handling is performed. For example, a message indicating that the operation is not permitted, etc., is presented to the user. The condition is described later in detail.

The operation history determination module 122 may determine as to whether or not the history, which is stored in the operation history storage module 140, of previous operations, executed by the user, of electronic information located in an ancestor node in the tree structure of the electronic information in question satisfies the predetermined condition. For example, specifically, the operation history determination module 122 determines as to whether or not the operation history of a folder that stores the electronic information in question (or a higher-level folder storing that folder) satisfies the predetermined condition.

Either or both of the operation right check module 121 and the operation history determination module 122 may be executed. In the example described above, the operation history determination module 122 performs its process after the operation right check module 121 performs its process. However, the operation history determination module 122 may execute its process concurrently with the process of the operation right check module 121. The operation history determination module 122 may execute its process without the process of the operation right check module 121. After the operation history determination module 122 performs its process, namely, if it is determined that the condition is not satisfied, the operation right check module 121 may perform its process.

The operation execution module 123 executes the operation of the electronic information in question or the association location associated with the electronic information in question. If the operation right check module 121 confirms that the user has the operation right or if the operation history determination module 122 determines that the operation history satisfies the predetermined condition, the operation is executed in accordance with the request received by the operation request receiving module 110. When the operation is executed, a copy of the electronic information to be operated may be provided, and the operation may be executed for the copy. If approval is given in response to an inquiry made by the inquiry module 160, the original electronic information, which is the copy source to be operated, may be updated based on the copy of the electronic information for which the operation has been performed.

The user information storage module 130 is accessed from the right/operation processing module 120. The user information storage module 130 stores information concerning the users, for example, information of names of the users, products that each user takes charge of, an organization to which each user belongs and the like.

The operation history storage module 140 is accessed from the right/operation processing module 120. The operation history storage module 140 stores operation history information indicating a history of previous operations, executed by the operation execution module 123, of electronic information and/or a history of previous operations, executed by the operation execution module 123, of the association locations associated with the electronic information. This means that the operation history storage module 140 stores the users' operation history of the electronic information.

The electronic information storage module 150 is accessed from the right/operation processing module 120. The electronic information storage module 150 stores electronic information to be operated. For example, the electronic information storage module 150 stores a document database, etc.

The inquiry module 160 is connected to the right/operation processing module 120. The inquiry module 160 inquires, in accordance with a command from the right/operation processing module 120, of a user who has a right of approving an operation executed by the operation execution module 123, as to whether or not to approve the operation. The inquiry module 160 passes the inquiry result (a reply of the user who has the right of approving the operation (approval or not)) to the right/operation processing module 120.

The switch module 170 is connected to the right/operation processing module 120. The switch module 170 receives a request from a user who has a right of operating the electronic information to be operated, in accordance with a command from the right/operation processing module 120. Then, the switch module 170 switches in response to the request between (i) a first state in which the operation history determination module 122 is caused to determine as to whether or not to permit the operation if the operation history determination module 122 determines that the request-source user does not have the operation right and (ii) a second state in which the operation history determination module 122 is not caused to determine as to whether or not to permit the operation if the operation history determination module 122 determines that the request-source user does not have the operation right. That is, the switch module 170 causes a person who has a right of operating the electronic information in question to determine as to whether to enable or disable the operation history determination module 122.

Figure 2:
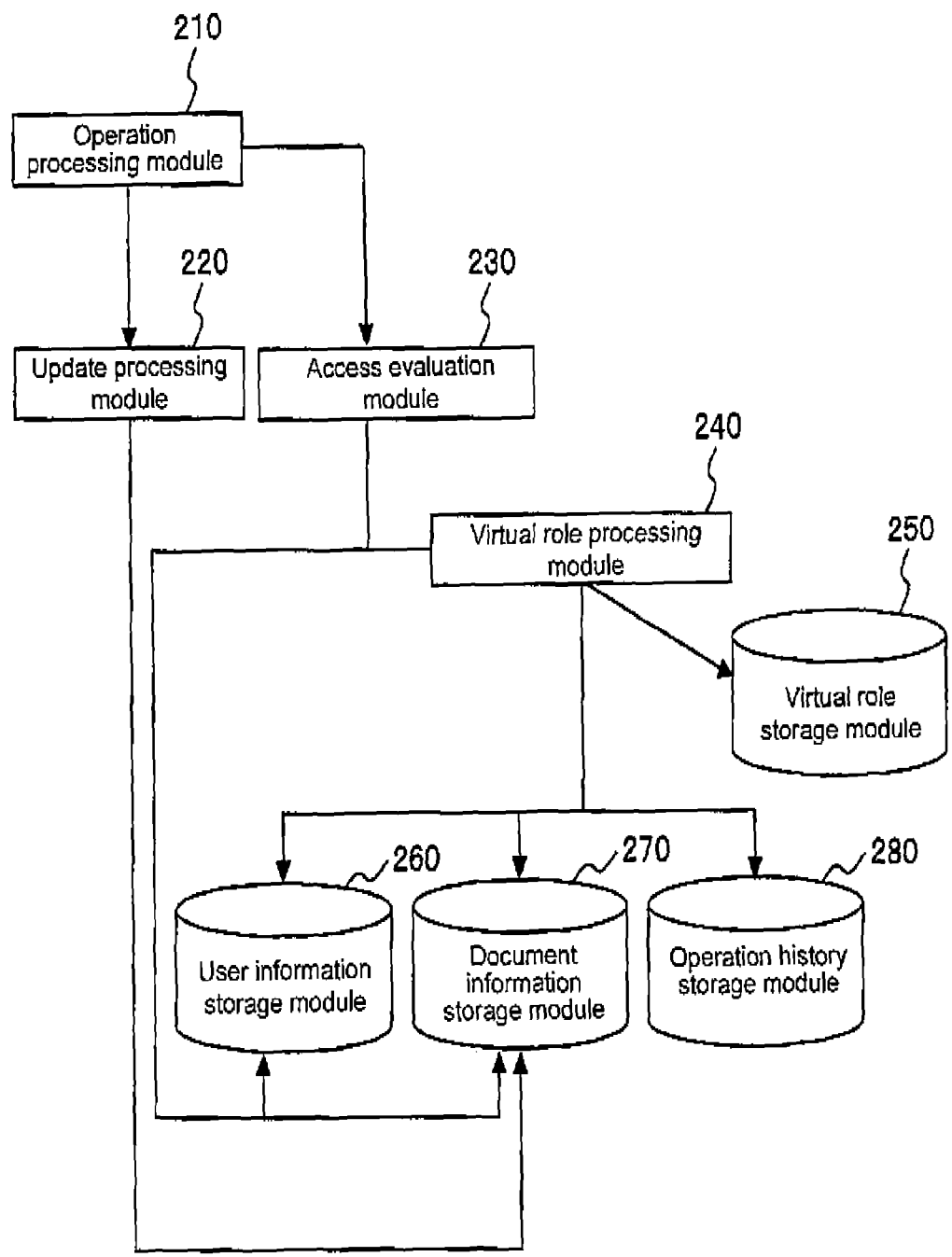
FIG. 2 is a conceptual module block diagram showing a configuration example of a first implementation form to implement the exemplary embodiment of the invention.

FIG. 2 is a conceptual module block diagram showing a configuration example of a first implementation form to implement the exemplary embodiment of the invention.

The first implementation form shown in the example in FIG. 2 has an operation processing module 210, an update processing module 220, an access evaluation module 230, a virtual role processing module 240, a virtual role storage module 250, a user information storage module 260, a document information storage module 270, and an operation history storage module 280.

The operation processing module 210 shown in the example in FIG. 2 is an exemplary embodiment of the operation request receiving module 110; the access evaluation module 230 is an exemplary embodiment of the operation right check module 121; the virtual role processing module 240 and the virtual role storage module 250 are an exemplary embodiment of the operation history determination module 122, the inquiry module 160, and the switch module 170; the update processing module 220 is an exemplary embodiment of the operation execution module 123; the user information storage module 260 is an exemplary embodiment of the user information storage module 130; the operation history storage module 280 is an exemplary embodiment of the operation history storage module 140; and the document information storage module 270 is an exemplary embodiment of the electronic information storage module 150.

In the exemplary embodiment (including first to third implementation forms), the concept of a "virtual role" is used. The "virtual role" is a condition for permitting a user who does not have an access right to a target document to operate the target document and is defined using an operation history of the target document. The "virtual role" may be a condition that is defined using an attribute of the target document, an operation history of an object relating to the target document (a parent folder, etc.), an attribute of the object relating to the target document, an attribute of the user, an attribute of the group containing the user, etc., in addition to the operation history of the target document.

For example, the virtual role is used when a user moves from one organization to another, etc. In a system that does not have the configuration of the exemplary embodiment of the invention, when a user moves from one organization to another, it becomes necessary to set an access right of the user, increase or decrease the number of members for the group, etc., and further it is necessary to validate the setting only for a certain time period.

The operation processing module 210 is connected to the update processing module 220 and the access evaluation module 230. The operation processing module 210 receives user's operation of a document. For example, if a user performs operation of selecting a document displayed on a display and opening the document (causing to display contents of the document), the operation processing module 210 detects this operation. Then, the operation processing module 210 checks, using the access evaluation module 230, if the user's operation of the document is possible. If the operation is permitted as a result of access evaluation by the access evaluation module 230, the operation processing module 210 causes the update processing module 220 to execute the operation. If the operation is not permitted as the result of access evaluation by the access evaluation module 230, the operation processing module 210 executes error handling such as presenting a message indicating that the operation is not permitted, and terminates the process.

The update processing module 220 is connected to the operation processing module 210 and the document information storage module 270. The update processing module 220 operates a document stored in the document information storage module 270 in response to an operation command from the operation processing module 210. For example, the update processing module 220 updates a document in the document information storage module 270 by accessing a document and editing contents of the document. A history of the operation is stored in the operation history storage module 280. For example, the operation history storage module 280 stores a user identifier to identify a user, date and time of the operation, the operation, and the like in association with a document identifier to identify the document.

The access evaluation module 230 is connected to the operation processing module 210, the virtual role processing module 240, the user information storage module 260, and the document information storage module 270. Upon reception of a command to evaluate an access right from the operation processing module 210, the access evaluation module 230 uses the information, which are stored in the user information storage module 260 and the document information storage module 270, to determine as to whether or not the user's operation of the document is permitted (general access evaluation). If the operation is permitted, the access evaluation module 230 sends a notification of permission of the operation to the operation processing module 210.

If the operation is not permitted, the access evaluation module 230 checks, using the virtual role processing module 240, if the user's operation of the document is possible. The access evaluation module 230 sends the access evaluation result by the virtual role processing module 240 to the operation processing module 210.

The virtual role processing module 240 is connected to the access evaluation module 230, the virtual role storage module 250, the user information storage module 260, the document information storage module 270, and the operation history storage module 280. Upon reception of the command to evaluate the access right from the access evaluation module 230, the virtual role processing module 240 determines as to whether or not a virtual role is set in the virtual role storage module 250. That is, the virtual role processing module 240 acquires settings of the virtual role from the virtual role storage module 250, searches the information, which are stored in the user information storage module 260, the document information storage module 270 and the operation history storage module 280, for information matching the conditions specified by the settings of the virtual role, and determines as to whether or not a user who attempts to operate falls under the virtual role. The virtual role processing module 240 sends the determination result to the access evaluation module 230.

When the virtual role processing module 240 permits an operation, even if a document is updated as a result of the operation, a person who has a right to determine as to whether or not to approve the update made by the operation, for example, a leader of a product that uses the document or the like may be notified that the document is operated by a user who is not permitted to access the document essentially. If the update is approved, the update made by the operation may be reflected on the document in the user information storage module 260.

The virtual role storage module 250 is accessed from the virtual role processing module 240. The virtual role storage module 250 stores information concerning the virtual role, for example, a virtual role information storage table 1200 shown in FIG. 12 and a virtual role condition storage table 1300 shown in FIG. 13.

FIG. 12 is a schematic representation showing a data structure example of the virtual role information storage table 1200. The virtual role information storage table 1200 has a vRole ID column 1210, a virtual role name column 1220, a creation date/time column 1230, a change date/time column 1240, and a miscellaneous attribute information column 1250, and is a table for storing information of the virtual role itself. The vRole ID column 1210 stores an identifier to identify the virtual role. The virtual role name column 1220 stores a name of the virtual role. The creation date/time column 1230 stores date and time at which the virtual role was created. The change date/time column 1240 stores change date and time of the virtual role if the virtual role is changed. The miscellaneous attribute information column 1250 stores information concerning attributes of the virtual role.

FIG. 13 is a schematic representation showing a data structure example of the virtual role condition storage table 1300. The virtual role condition storage table 1300 has a vRole ID column 1310, an order column 1320, a target concatenation column 1330, an extraction target column 1340, a condition concatenation column 1350, and a condition column 1360. The virtual role condition storage table 1300 is a table for storing settings (conditions) of the virtual roles. The vRole ID column 1310 stores the virtual role identifiers. The virtual role is made up of rows having the same virtual role identifier. For example, the virtual role of the virtual role identifier 200002 shown in FIG. 13 is made up of conditions in the third to eighth rows. The order column 1320 stores an application order of respective rows as conditions in each virtual role. The target concatenation column 1330 stores a concatenation relation between conditions concerning a target user or a target group. The concatenation relation refers to a logical relation between conditions and is, for example, AND, OR, etc. The extraction target column 1340 stores a target to be extracted as the condition, for example, a user, a group, a history, etc. The condition concatenation column 1350 stores a concatenation relation with a condition described in the condition column 1360 in the preceding row. The concatenation relation refers to a concatenation relation with a condition described in the condition column 1360 in the preceding row, and is, for example, AND or OR. The condition column 1360 stores the conditions. These are used to generate a virtual role. The meaning of the specific virtual role will be described later.

The user information storage module 260 is accessed from the access evaluation module 230 and the virtual role processing module 240. The user information storage module 260 stores the information concerning each user, such as the name of each user and the organization to which each user belongs, in association with the user identifier of each user. The user information storage module 260 also stores information concerning each group, for example, the user identifiers contained in each group, etc. One group may include another group as well as its users, and may have a tree structure.

FIG. 18 is a schematic representation showing an example of a data structure of user attributes stored in the user information storage module 260. As shown in FIG. 18, the user information storage module 260 stores, for example, a user ID column 1810, a user name column 1820, a product name column(s) 1830 to 1850, a creation date column 1860, a last update date column 1870 and a miscellaneous attribute information column 1880. The user ID column 1810 stores an identifier of each user. The user name column 1820 stores a user name of each user. The product name column stores a product name of a product that each user takes charge of. The creation date column 1860 stores a creation date of each user. The last update date column 1870 stores a last update date of each user. Each user attribute may be referred to by an element "userDef.attribute" (e.g., userDef.productName) in a condition expression. It is noted that the number of products that each group takes charge of is not limited to three, but may be less than three or more than three. A conditional expression will be described later. In this exemplary embodiment, any other information may be added to the user information storage module 260 (attributes of users) desirably.

Also, FIG. 19 is a schematic representation showing an example of a data structure of group attributes stored in the user information storage module 260. As shown in FIG. 19, the user information storage module 260 also stores, for example, a group ID column 1910, a group name column 1920, a user name column(s) 1930 to 1950, a creation date column 1960, a last update date column 1970 and a miscellaneous attribute information column 1980. The group ID column 1910 stores an identifier of each group. The group name column 1920 stores a group name of each group. The user name column(s) 1930 to 1950 store a user name(s) of a user(s) who belong to each group. The creation date column 1960 stores a creation date of each group. The last update date column 1970 stores a last update date of each group. It is noted that the number of users belonging to each group is not limited to three, but may be less than three or more than three. Each group attribute may be referred to by an element "groupDef.attribute" in a condition expression. A conditional expression will be described later. In this exemplary embodiment, any other information may be added to the user information storage module 260 (attributes of groups) desirably.

The document information storage module 270 is accessed from the update processing module 220 and the virtual role processing module 240 and stores documents. The document information storage module 270 may store attributes concerning each document (including a user, a group, or the like who is permitted to access each document), a tree structure of folders, and the like.

FIG. 20 is a schematic representation showing an example of a data structure of document attributes (object attributes) stored in the document information storage module 270. As shown in FIG. 20, the document information storage module 270 stores, for example, an object ID column 2010, a document name (object name) column 2020, a product name column 2030 indicating, a creator column 2040, a creation date column 2050, a last update date column 2060 indicating, a last update person column 2070 and a miscellaneous attribute information column 2080. The object ID column 2010 stores an identifier of each document (each object). The document name column 2020 stores a document name of each document. The product name column 2030 stores a product name of a product that each document relates to. The creator column 2040 stores a creator name of a creator who created each document. The creation date column 2050 stores a creation date of each document. The last update date column 2060 stores a last update date of each document. Each object attribute may be referred to by an element "Object.attribute" (e.g., Object.productName) in a condition expression. In this exemplary embodiment, any other information may be added to the document information storage module 270 (attributes of objects) desirably.

The attributes of the objects (e.g., documents) may be classified into two types, that is, system attributes and user defined attributes. The system attributes are attributes that a system prepares. For example, the object name, the creator, the creation date, the last update date and the last update person shown in FIG. 20 are examples of the system attributes. Any object has the respective system attributes. On the other hand, the user defined attributes are attributes that a user (or a company) who uses the system adds at a desired timing. For example, the product name shown in FIG. 20 is an example of the user defined attributes. In the example of FIG. 20, since each document relates to a corresponding product, which product each document relates to is set in the attributes of each document. It is noted that the user defined attribute is not limited to the product name, but may be any information that a user wants to set.

The operation history storage module 280 is accessed from the virtual role processing module 240. The operation history storage module 280 stores information concerning the history of operation, performed by each user stored in the user information storage module 260, of a document(s) stored in the document information storage module 270. For example, the operation history storage module 280 stores an operation history storage table 1100 shown in FIG. 11. FIG. 11 is a schematic representation showing a data structure example of the operation history storage table 1100. The operation history storage table 1100 has an object ID column 1110, an operator column 1120, an operation date/time column 1130, an operation description column 1140, a management information column 1150, and a miscellaneous attribute information column 1160. The object ID column 1110 stores an identifier of an operation target document or an identifier of an operation target folder. The operator column 1120 stores an identifier of a user who executes an operation. The operation date/time column 1130 stores date and time at which the operation was executed (years, minutes, seconds, etc., may be contained). The operation description column 1140 stores description of the operation. In FIG. 11, "(parent)" is used to mean a folder in which the document is stored, and "itself" refers to the document itself. The management information column 1150 stores information required for managing the operation history. The miscellaneous attribute information column 1160 stores information concerning attributes of the operation history.

In this exemplary embodiment, information extracted by an element "History.operaetionUser" may include that when (operationDate) and how (miscellaneous attribute information) who (operationUser) performs what operation (operation) for what (Object). Also, "ObjectHistory" is one form of HISTORY. If an object is specified, an operation history of the object may be referred to by using the element "ObjectHistory".

The information stored in the operation history storage table 1100 can be specified as the condition for determining the group/user in the virtual role.

Figure 3:
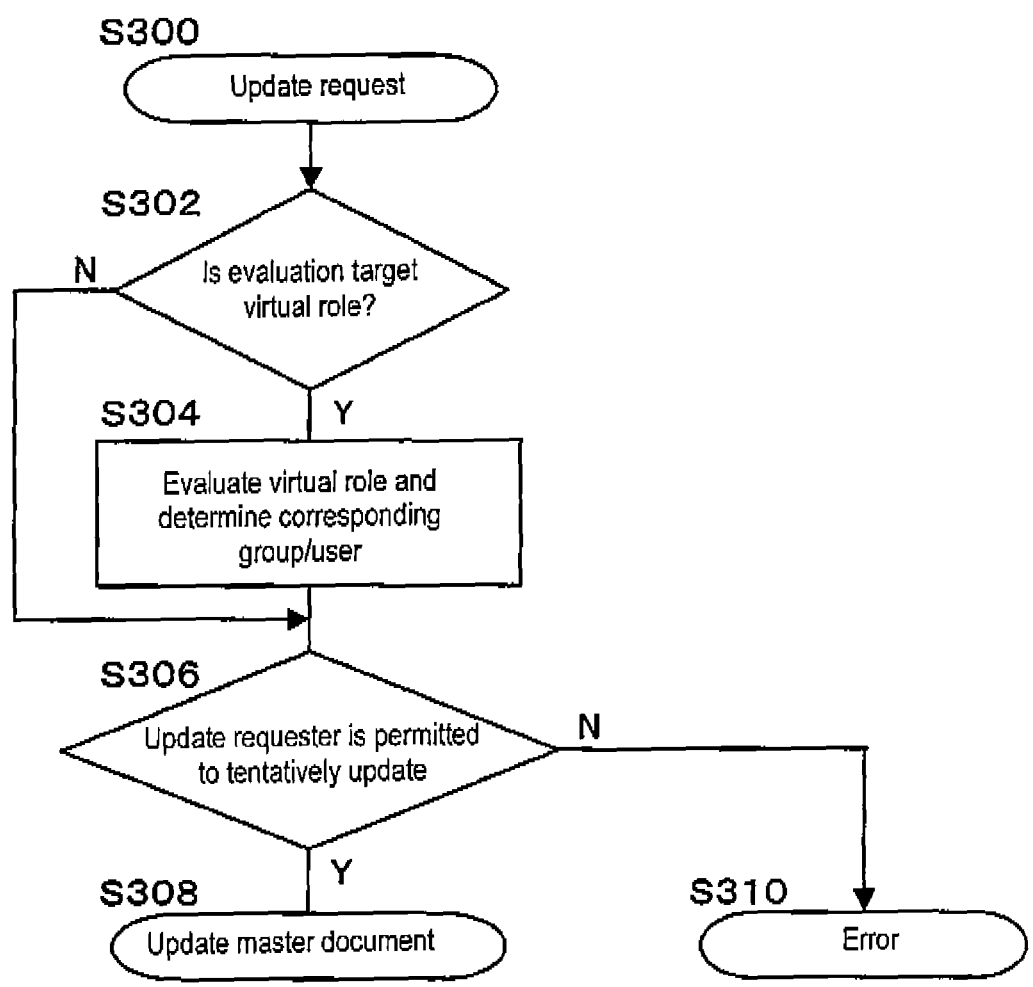
FIG. 3 is a flowchart to show a process example according to the first implementation form.

FIG. 3 is a flowchart to show a process example according to the first implementation form. That is, the case where the operation processing module 210 receives an update request for a certain document, and a user does not have a general access right to the certain document (that is, a process concerning a determination using the virtual role) will be described.

At step S302, the virtual role processing module 240 determines as to whether or not an evaluation target (the user who attempts to operate the certain document) is a target in the virtual role stored in the virtual role storage module 250. For example, at step S302, it may be determined as to whether or not a virtual role is set in settings of an access right in place of users, groups and roles. If it is determined that a virtual role stored in the virtual role storage module 250 is set in the settings of the access right, the settings of the access right may be the "target in the virtual role". In other words, the "target in the virtual role" may be the settings stored in the settings stored in the virtual role storage module 250. If the evaluation target is the target in the virtual role (Y), the flow goes to step S304; otherwise (N at step S302), the flow goes to step S306.

At step S304, the virtual role processing module 240 evaluates the virtual role, which is, for example, what is specified in the settings of the access right of a user in place of users, groups and roles. Then, the virtual role processing module 240 determines a group or a user matching the virtual role. Details of this process will be described later with reference to FIG. 6.

At step S306, if the virtual role processing module 240 determines that tentative update made by the user who makes the update request satisfies the condition of the virtual role (Y), that is, the user who makes the update request belongs to the determined group or is the determined user, the flow goes to step S308; otherwise (N at step S306), the flow goes to step S310. The "tentative update" will be described later with reference to FIGS. 14 to 16 (see the "tentative access (tentative update) process" section).

At step S308, the update processing module 220 executes the operation (that is, the update request) and updates the target document (master document) in the document information storage module 270.

At step S310, the operation processing module 210 performs error handling such as presenting a message indicating that the update is not permitted, etc.

Figure 4:
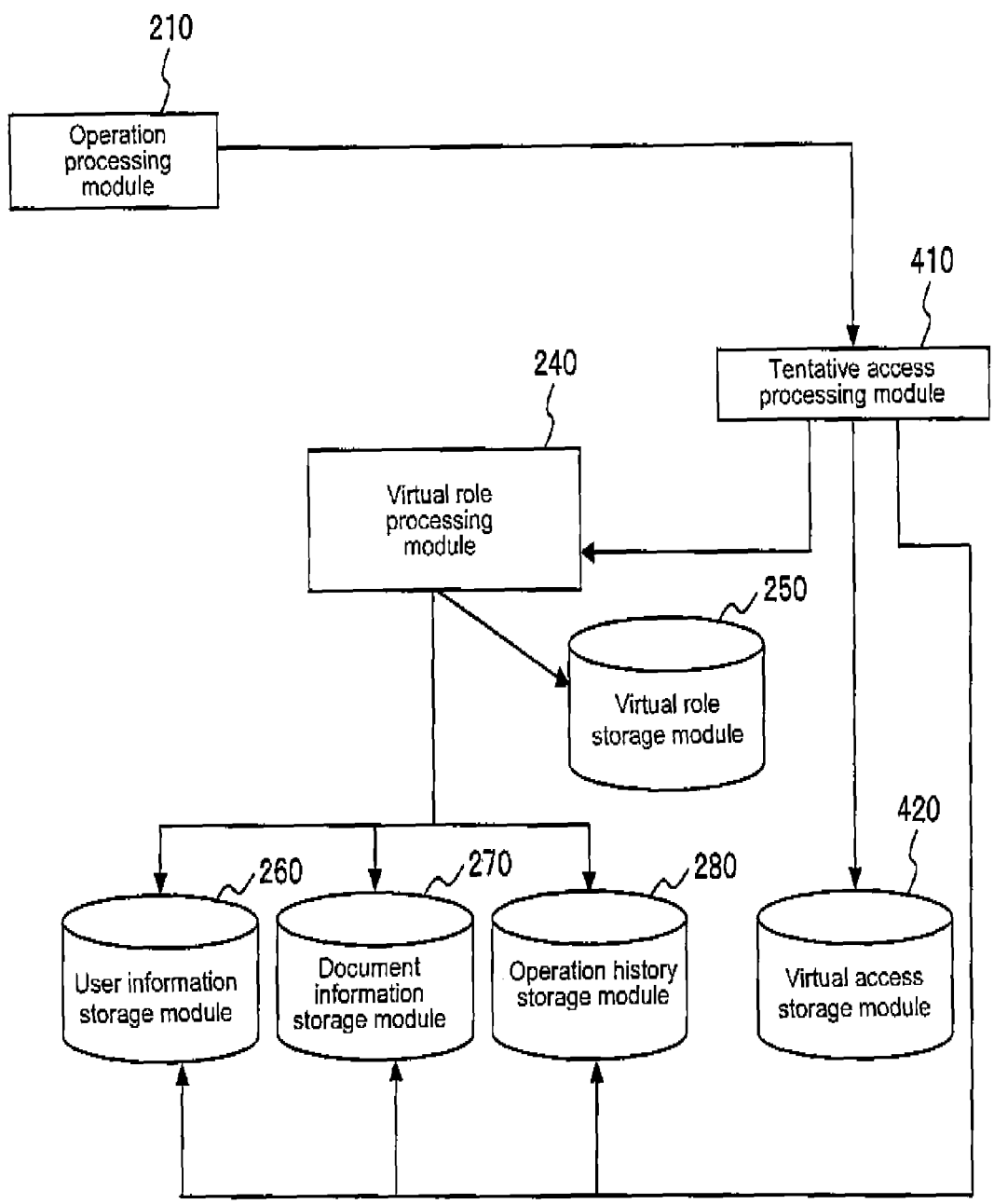
FIG. 4 is a conceptual module block diagram showing a configuration example of a second implementation form to implement the exemplary embodiment of the invention.

FIG. 4 is a conceptual module block diagram showing a configuration example of a second implementation form to implement the exemplary embodiment of the invention. The second implementation form shown in FIG. 4 has the operation processing module 210, the virtual role processing module 240, the virtual role storage module 250, the user information storage module 260, the document information storage module 270, the operation history storage module 280, a tentative access processing module 410, and a tentative access storage module 420. The update processing module 220 and the access evaluation module 230 of the first implementation form shown in FIG. 2 are eliminated, and the tentative access processing module 410 and the tentative access storage module 420 are added. The modules identical with or similar to those of the first implementation form are denoted by the same reference numerals in the second implementation form and will not be described again. However, if the module denoted by the same reference numeral involves an additional function, process, etc., as well as those of the first implementation form, a description will be given thereon.

The operation processing module 210 is connected to the tentative access processing module 410. The operation processing module 210 receives user's operation of a document and checks, using the tentative access processing module 410, if the user's operation of the document is possible as tentative operation.

The tentative access processing module 410 is connected to the operation processing module 210, the virtual role processing module 240, the user information storage module 260, the document information storage module 270, the operation history storage module 280, and the tentative access storage module 420. Upon reception of a command to evaluate an access right from the operation processing module 210, the tentative access processing module 410 checks, using the virtual role processing module 240, if the user's tentative operation of the document is possible. If the tentative operation is permitted, the tentative access processing module 410 executes the tentative operation of the document stored in the document information storage module 270 and temporarily stores the resultant document in the tentative access storage module 420. Then, if a person who has a right to determine as to whether or not to approve the update made by the tentative operation approves the update, the tentative access processing module 410 updates the document in the document information storage module 270. If the tentative operation is not permitted, the tentative access processing module 410 sends a message indicating that the tentative operation is not permitted to the operation processing module 210.

The tentative access storage module 420 is connected to the tentative access processing module 410. The tentative access storage module 420 stores information concerning tentative operation such as the tentatively operated document.

The virtual role processing module 240 is connected to the virtual role storage module 250, the user information storage module 260, the document information storage module 270, the operation history storage module 280, and the tentative access processing module 410. Upon reception of the command to evaluate an access right from the tentative access processing module 410, the virtual role processing module 240 executes a process similar to that in the first implementation form.

Figure 5:
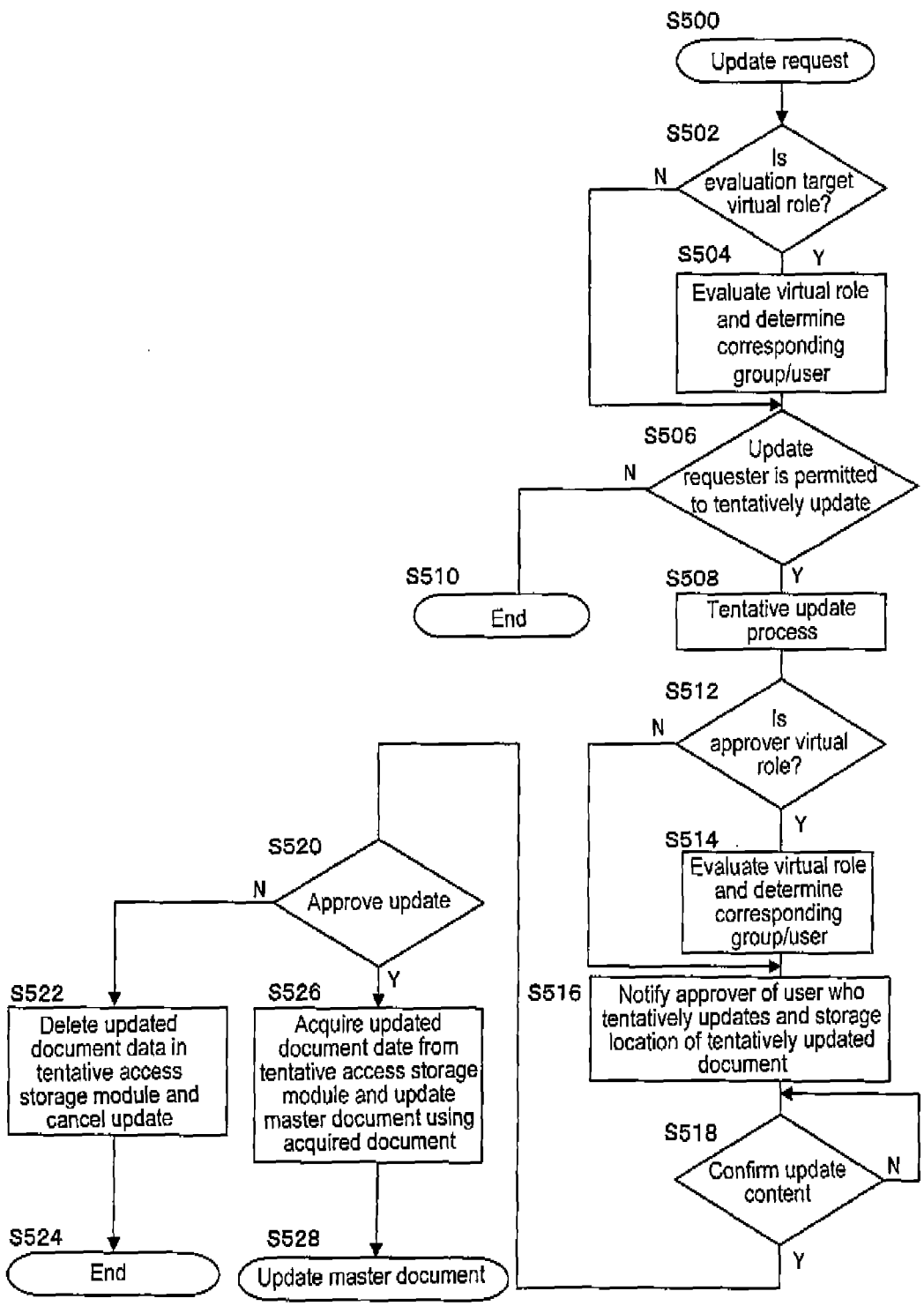
FIG. 5 is a flowchart showing a process example according to the second implementation form.

FIG. 5 is a flowchart to show a process example according to the second implementation form. That is, a process in which the operation processing module 210 receives a tentative update request for a certain document and a determination is made using a virtual role will be described.

Steps S502 to S506 are similar to steps S302 to 306 in the flowchart shown in FIG. 3. It is noted that, at step S502, it is determined as to whether or not a virtual role is set in settings of an access right, for example, like step S302.

At step S508, the tentative access processing module 410 executes a tentative operation, that is, operates the document stored in the document information storage module 270 and stores the operation result in the tentative access storage module 420 as a tentative update result. This means that this operation does not update the target document itself in the document information storage module 270.

At step S512, the virtual role processing module 240 determines as to whether or not an approver who has an update right is a target in the virtual role stored in the virtual role storage module 250. For example, at step S512, it may be determined as to whether or not a virtual role is set in settings of an approver in place of users, groups and roles. If it is determined that a virtual role stored in the virtual role storage module 250 is set in the settings of the approver, the settings of the approver may be the "target in the virtual role". In other words, the "target in the virtual role" may be the settings stored in the settings stored in the virtual role storage module 250. If the approver is the target in the virtual role (Y), the flow goes to step S514; otherwise (N at step S512), the flow goes to step S516.

At step S514, the virtual role processing module 240 evaluates the virtual role and determines a corresponding group or user. Details of the process example will be described later.

At step S516, the tentative access processing module 410 notifies the approver of a name of the user who performs the tentative update operation and a storage location of the tentatively updated document in the tentative access storage module 420.

At step S518, it is determined as to whether or not the approver confirms the update content, which is sent at S516. That is, it is detected that the approver performs operation indicating confirmation of the update content. For example, it is detected that a confirm button is selected or that the notification is opened and the document in the tentative access storage module 420 is accessed, etc. If the approver confirms the update content (Y), the flow goes to S520; otherwise (N at step S518), step S518 is repeated.

At step S520, it is determined as to whether or not the approver approves the update. If the approver approves the update (Y), the flow goes to step S526; otherwise (N at step S520), the flow goes to step S522.

At step S522, the tentative access processing module 410 deletes the updated document data in the tentative access storage module 420 and cancels the update. That is, this process results in that the operation is not performed.

At step S526, the tentative access processing module 410 acquires the updated document data from the tentative access storage module 420 and updates the master document in the document information storage module 270 using the acquired document data.

Figure 6A:
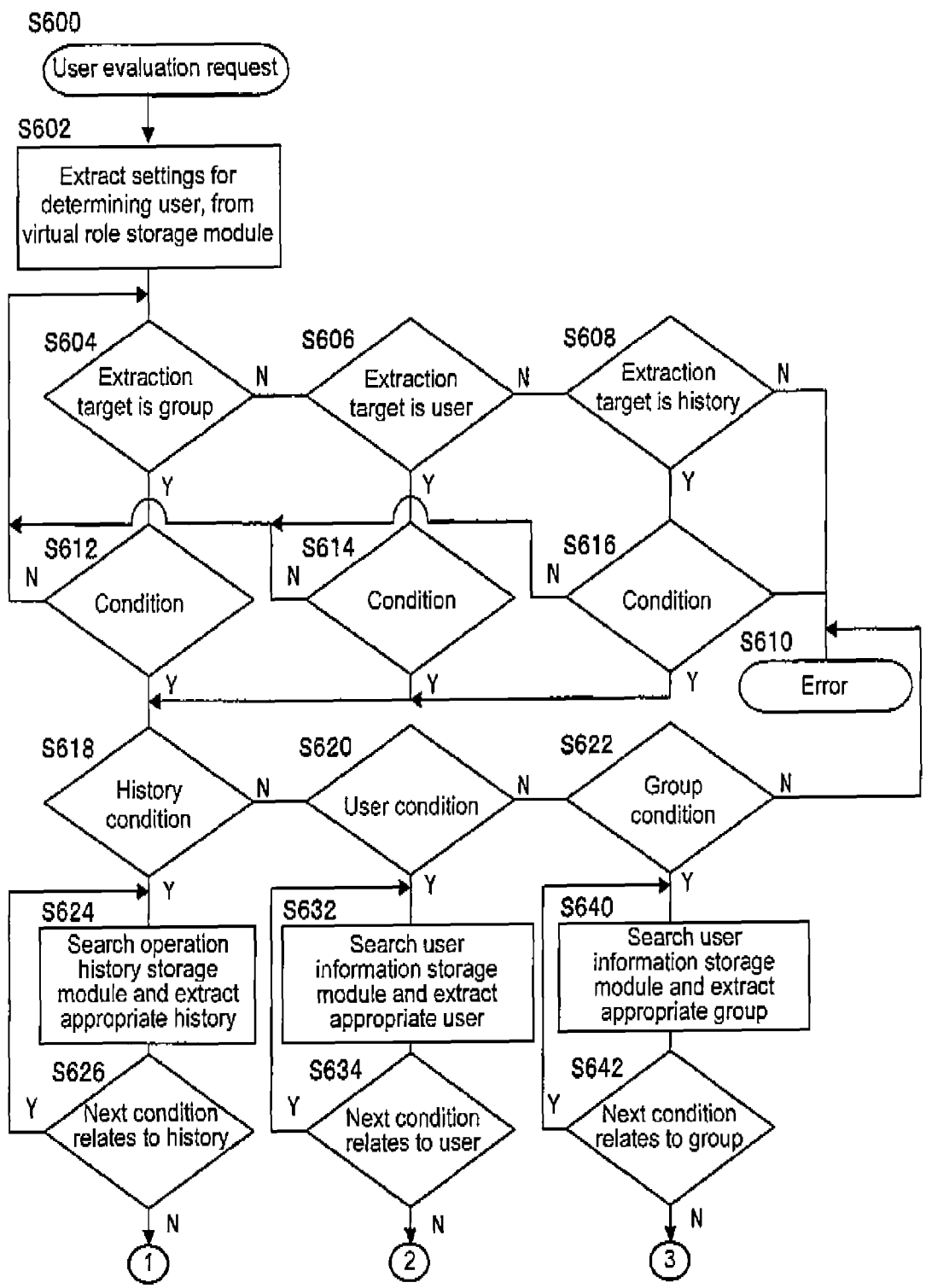
FIGS. 6A and 6B are flowcharts showing a process example of user evaluation according to the second implementation form.
Figure 6B:
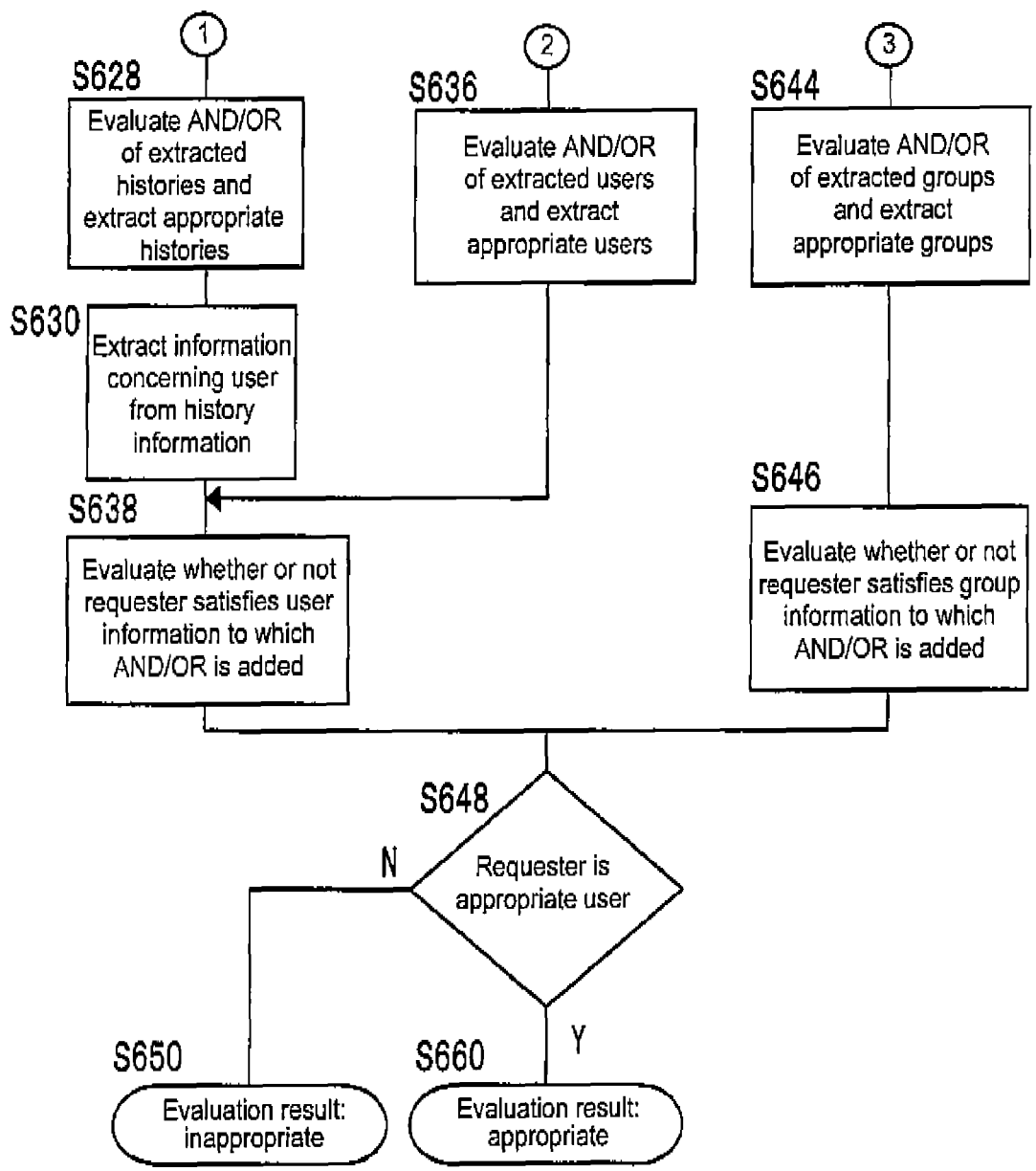

FIGS. 6A and 6B are flowcharts to show a process example of user evaluation according to the second implementation form, that is, process contents at step S504 and S514.

At step S602, the virtual role processing module 240 extracts settings (virtual role) for determining a user, from the virtual role storage module 250.

At step S604, the virtual role processing module 240 determines as to whether or not an extraction target (the extraction target column 1340 of the virtual role condition storage table 1300) is a group. If the virtual role processing module 240 determines that the extraction target is a group (Y), the flow goes to step S612; otherwise (N at step S604), the flow goes to step S606.

At step S606, the virtual role processing module 240 determines as to whether or not the extraction target (the extraction target column 1340 of the virtual role condition storage table 1300) is a user. If the virtual role processing module 240 determines that the extraction target is a user (Y), the flow goes to step S614; otherwise (N at step S606), the flow goes to step S608.

At step S608, the virtual role processing module 240 determines as to whether or not the extraction target (the extraction target column 1340 of the virtual role condition storage table 1300) is a history. If the virtual role processing module 240 determines that the extraction target is a history (Y), the flow goes to step S616; otherwise (N at step S608), the process goes to step S610.

At step S610, the tentative access processing module 410 performs error handling.

At step S612, S614, or S616, the virtual role processing module 240 determines as to whether or not there is a condition (the condition column 1360 of the virtual role condition storage table 1300). If the virtual role processing module 240 determines that there is a condition (Y), the flow goes to step S618; otherwise (N at step S612, S614, or S616), the process returns to step S604.

At step S618, the virtual role processing module 240 determines as to whether or not the condition relates to a history. If the virtual role processing module 240 determines that the condition relates to a history (Y), the flow goes to step S624; otherwise (N at step S618), the flow goes to step S620.

At step S620, the virtual role processing module 240 determines as to whether or not the condition relates to a user. If the virtual role processing module 240 determines that the condition relates to a user (Y), the flow goes to step S632; otherwise (N at step S620), the flow goes to step S622.

At step S622, the virtual role processing module 240 determines as to whether or not the condition relates to a group. If the virtual role processing module 240 determines that the condition relates to a group (Y), the flow goes to step S640; otherwise (N at step S622), the flow goes to step S610.

At step S624, the virtual role processing module 240 searches the operation history storage module 280 and extracts a history that meets the history condition.

At step S626, the virtual role processing module 240 determines as to whether or not the next condition also relates to a history. If the virtual role processing module 240 determines that the next condition relates to a history (Y), the flow returns to step S624; otherwise (N at step S626), the flow goes to step S628.

At step S628, the virtual role processing module 240 evaluates a logical relation between the history conditions of the virtual role (the condition concatenation column 1350 of the virtual role condition storage table 1300) and extracts some of the histories extracted at step S624 that meets the history conditions of the virtual role, which are concatenated with the evaluated logical relation.

At step S630, the virtual role processing module 240 extracts information concerning a user who executes the history, from information of the history extracted at step S628.

At step S632, the virtual role processing module 240 searches the user information storage module 260 and extracts a user who meets the user condition.

At step S634, the virtual role processing module 240 determines as to whether or not the next condition also relates to a user. If the virtual role processing module 240 determines that the next condition relates to a user (Y), the flow returns to step S632; otherwise (N at step S634), the flow goes to step S636.

At step S636, the virtual role processing module 240 evaluates a logical relation between the user conditions of the virtual role (the condition concatenation column 1350 of the virtual role condition storage table 1300) and extracts some of the users extracted at step S632 who meets the user conditions of the virtual role, which are concatenated with the evaluated logical relation.

At step S638, the virtual role processing module 240 evaluates as to whether or not the requester, that is, the user who executes the operation satisfies the conditions to which a logical relation of information concerning the user(s) extracted at step S630 (the target concatenation column 1330 of the virtual role condition storage table 1300) is added.

At step S640, the virtual role processing module 240 searches the user information storage module 260 and extracts a group that meets the group condition.

At step S642, the virtual role processing module 240 determines as to whether or not the next condition also relates to a group. If the virtual role processing module 240 determines that the next condition relates to a group (Y), the flow returns to step S640; otherwise (N at step S642), the flow goes to step S644.

At step S644, the virtual role processing module 240 evaluates a logical relation between the group conditions of the virtual role (the condition concatenation column 1350 of the virtual role condition storage table 1300) and extracts some of the groups extracted at step S640 that meets the group conditions of the virtual role, which are concatenated with the evaluated logical relation.

At step S646, the virtual role processing module 240 evaluates as to whether or not the requester, that is, the user who executes the operation is a user belonging to the group satisfying the conditions to which the logical relation of information concerning the group extracted at step S644 (the target concatenation column 1330 of the virtual role condition storage table 1300) is added.

At step S648, the virtual role processing module 240 determines as to whether or not the requester, that is, the user who executes the operation is a user who falls under the conditions of the virtual role, based on the evaluation result at step S638 or S646. If the virtual role processing module 240 determines that the requester is a user who falls under the conditions of the virtual role (Y), the process goes to step S660; otherwise (N at step S648), the process goes to step S650.

At step S650, it turns out that the requester, that is, the user who executes the operation does not satisfy the condition of the virtual role as the evaluation result.

At step S660, it turns out that the requester, that is, the user who executes the operation satisfies the condition of the virtual role as the evaluation result.

Figure 7:
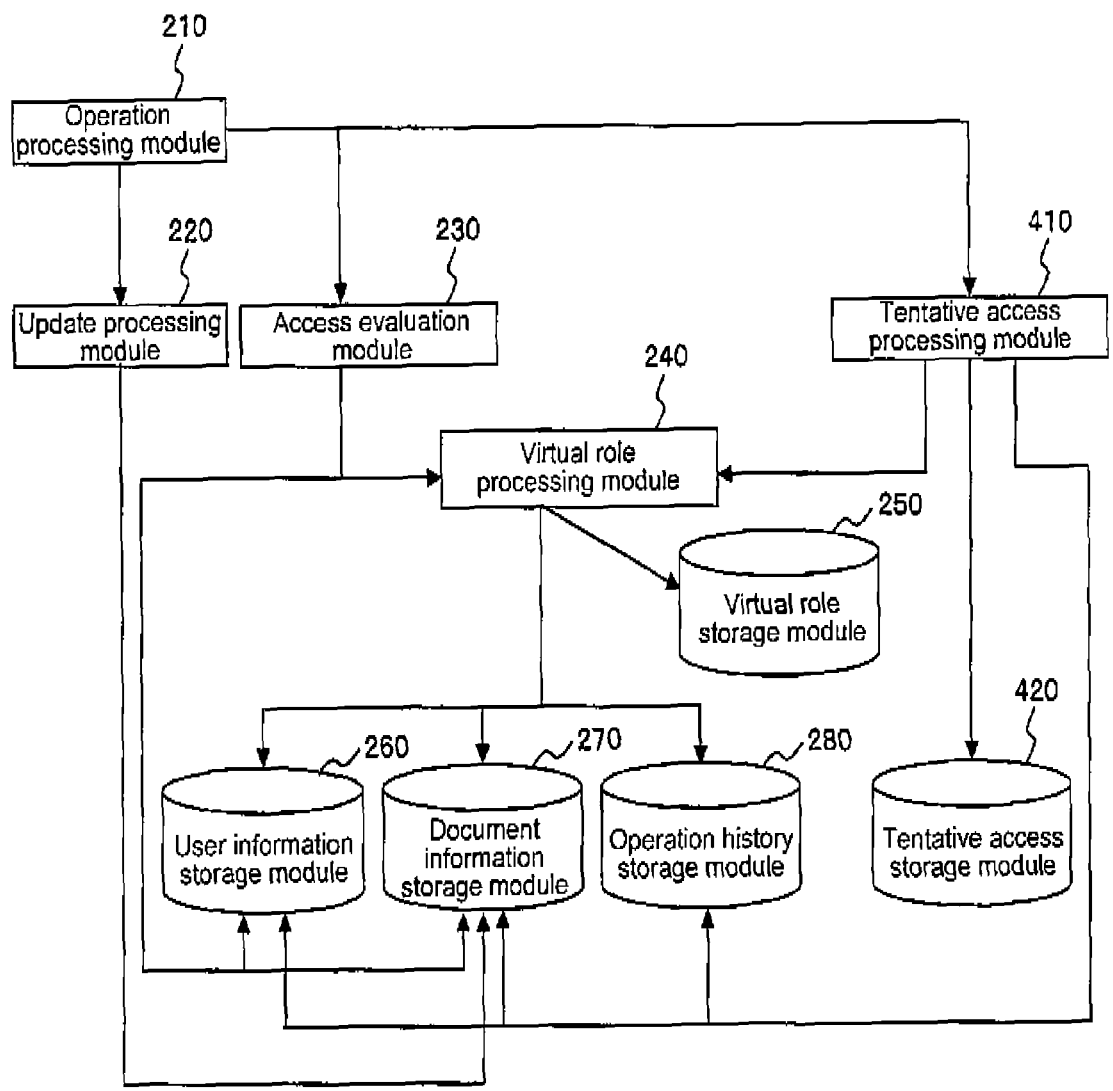
FIG. 7 is a conceptual module block diagram showing a configuration example of a third implementation form to implement the exemplary embodiment of the invention.

FIG. 7 is a conceptual module block diagram showing a configuration example of a third implementation form to implement the exemplary embodiment of the invention. The modules identical with or similar to those of the first or second implementation form are denoted by the same reference numerals in the third implementation form and will not be described again. However, if the module denoted by the same reference numeral involves another function, another process or the like in addition to those of the first or second implementation form, description will be given thereon.

The third implementation form shown in FIG. 7 has an operation processing module 210, an update processing module 220, an access evaluation module 230, a virtual role processing module 240, a virtual role storage module 250, a user information storage module 260, a document information storage module 270, an operation history storage module 280, a tentative access processing module 410, and a tentative access storage module 420. This means that the third implementation form is provided by combining the first implementation form shown in FIG. 2 and the second implementation form shown in FIG. 4. That is, the tentative access right is provided as the access right and if the access right is not set, whether or not the condition according to the virtual role is satisfied is determined and if the tentative access right is set, whether or not the condition according to the virtual role is satisfied is determined.

The operation processing module 210 is connected to the update processing module 220, the access evaluation module 230, and the tentative access processing module 410. The operation processing module 210 receives user's operation of a document. First, the operation processing module 210 checks, using the access evaluation module 230, if the user's operation of the document is possible. Then, if the operation is permitted as a result of access evaluation by the access evaluation module 230, the operation processing module 210 causes the update processing module 220 to execute the operation. Also, if the user's operation of the document is possible as tentative operation as a result of the access evaluation by the access evaluation module 230, the operation processing module 210 causes the tentative access processing module 410 to execute processing.

The access evaluation module 230 is connected to the operation processing module 210, the virtual role processing module 240, the user information storage module 260, and the document information storage module 270. Upon reception of a command to evaluate an access right from the operation processing module 210, the access evaluation module 230 uses information stored in the user information storage module 260 and the document information storage module 270 to determine as to whether or not the user's operation of the document is permitted (general access evaluation). If the operation is permitted, the access evaluation module 230 notifies permission of the operation to the operation processing module 210.

If the user's operation of the document is possible as the tentative operation, the access evaluation module 230 notifies to the operation processing module 210 that the operation is possible as the tentative operation. The operation processing module 210 causes the tentative access processing module 410 to execute processing.

Next, if the user's operation of the document does not fall under any of the above cases, the access evaluation module 230 checks, using the virtual role processing module 240, if the user's operation of the document is possible. The access evaluation module 230 sends the access evaluation result by the virtual role processing module 240 to the operation processing module 210.

The virtual role processing module 240 is connected to the access evaluation module 230, the virtual role storage module 250, the user information storage module 260, the document information storage module 270, the operation history storage module 280, and the tentative access processing module 410. The virtual role processing module 240 receives the command to evaluate an access right from the access evaluation module 230 and the tentative access processing module 410. For one operation received by the operation processing module 210, the virtual role processing module 240 receives a command to evaluate an access right is received from either of the access evaluation module 230 or the tentative access processing module 410 or receives no command (if the operator has a general access right).

Figure 8A:
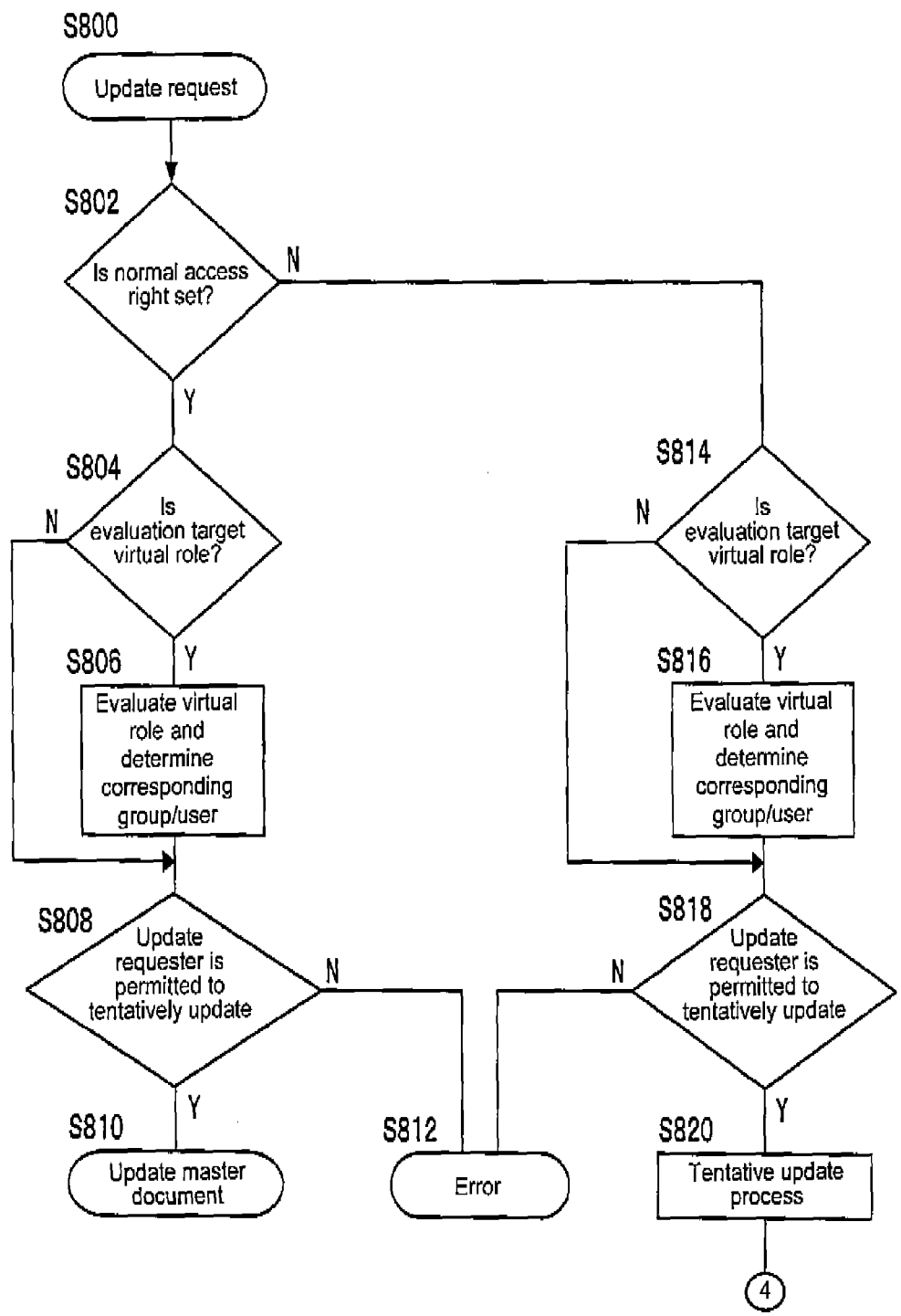
FIGS. 8A and 8B are flowcharts showing a process example according to the third implementation form.
Figure 8B:
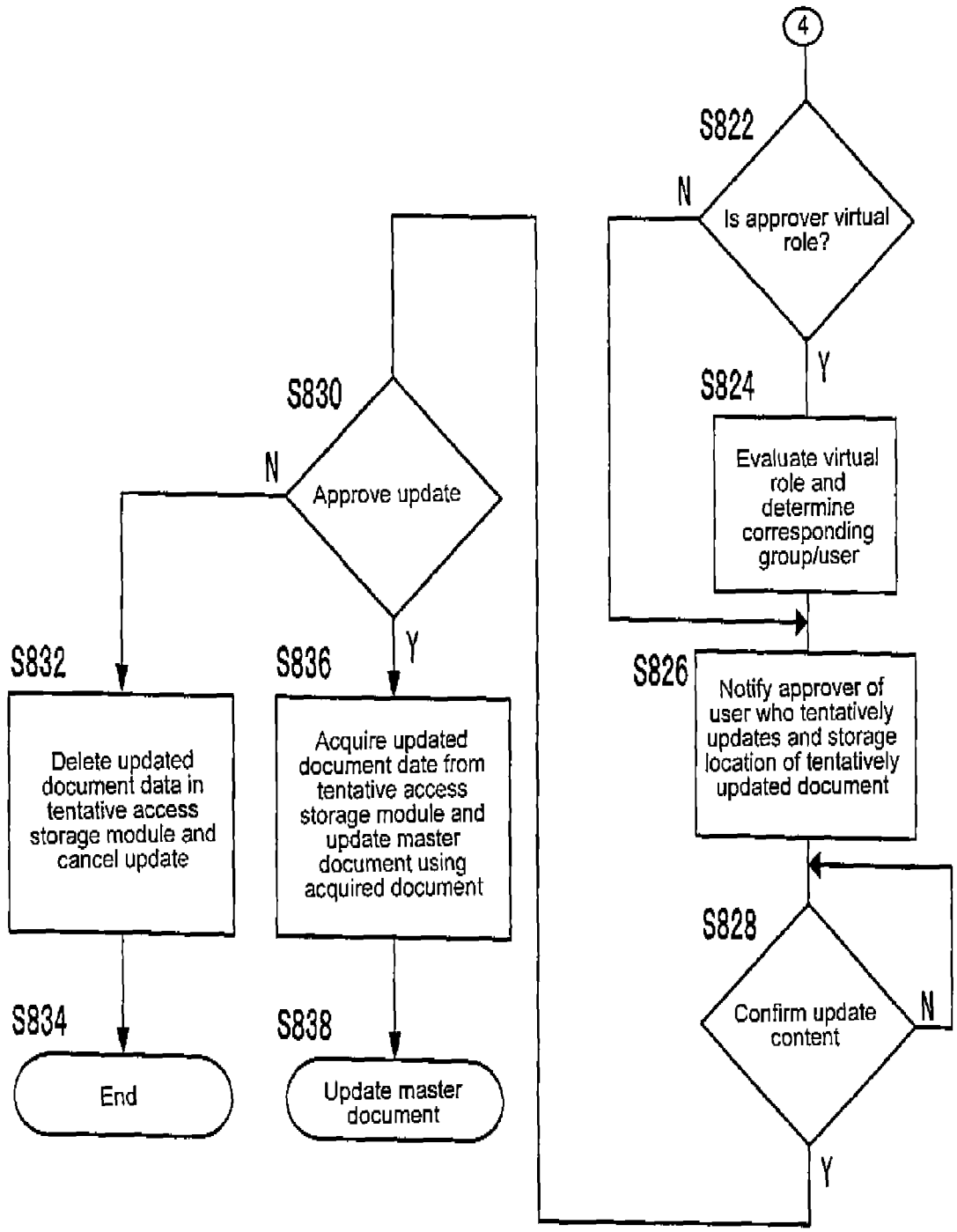

FIGS. 8A and 8B are flowcharts to show a process example according to the third implementation form. That is, a process that is executed when the operation processing module 210 receives an update request for a certain document will be described.

At step S802, the access evaluation module 230 determines as to whether or not permission of the user's operation of the document is determined based on setting of a usual access right, that is, determines as to whether or not a tentative access right is set. If a usual access right is set (Y, that is, if tentative access right is not set), the process goes to step S804; otherwise, the process goes to S814.

Steps S804 to S812 correspond to steps S302 to S310 in the flowchart shown in FIG. 3.

Steps S814 to S838 correspond to steps S502 to S528 in the flowchart shown in FIG. 5. It is noted that step S812 corresponds to step S510.

Figure 9A:
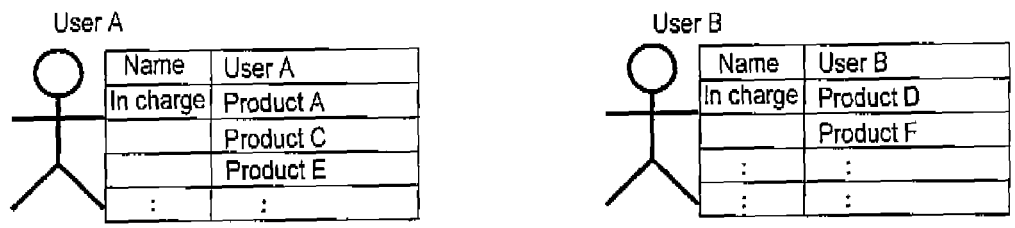
FIGS. 9A to 9C are schematic representations showing an example in which works assigned to users are changed.
Figure 9B:
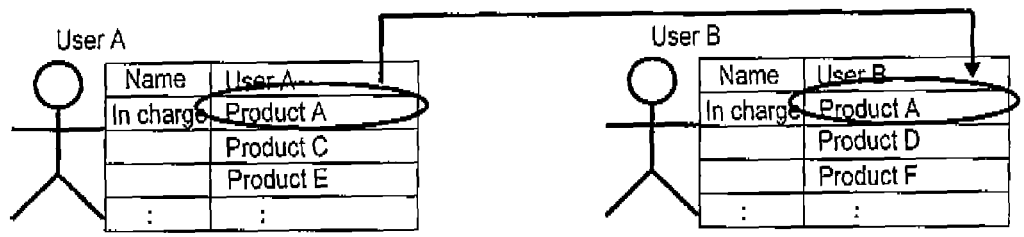
Figure 9C:
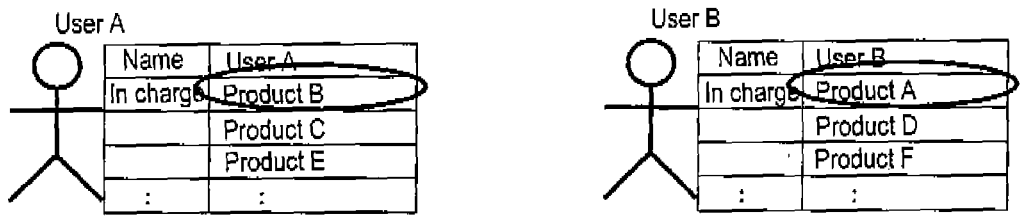

FIGS. 9A to 9C are schematic representations showing an example in which works assigned to users are changed. FIG. 9A shows that a user A takes charge of products A, C, E, etc., and a user B takes charge of products D, F, etc. The products assigned to the respective persons are changed so that the user A does not take charge of the product A and that the user B newly takes charge of the product A as shown in FIG. 9B. Further, user A newly takes charge of the product B and is still in charge of products B, C, E, etc., as shown in FIG. 9C. As a result, the user B is in charge of the products A, D, F, etc.

For example, if the user A were to attempt to change a document used in the product A just after this status comes into effect, it would be impossible for the user A to operate that document since the time when the user A does not take in charge of the product A if any of the first to third implementation forms is not used. On the other hand, the user B can operate that document without restriction although he/she is just takes in charge of the product A. In such a case, the first to third implementation forms enable the user A who satisfies the condition of the virtual role to operate that document and restrict the user B from executing that operation.

Figure 10:
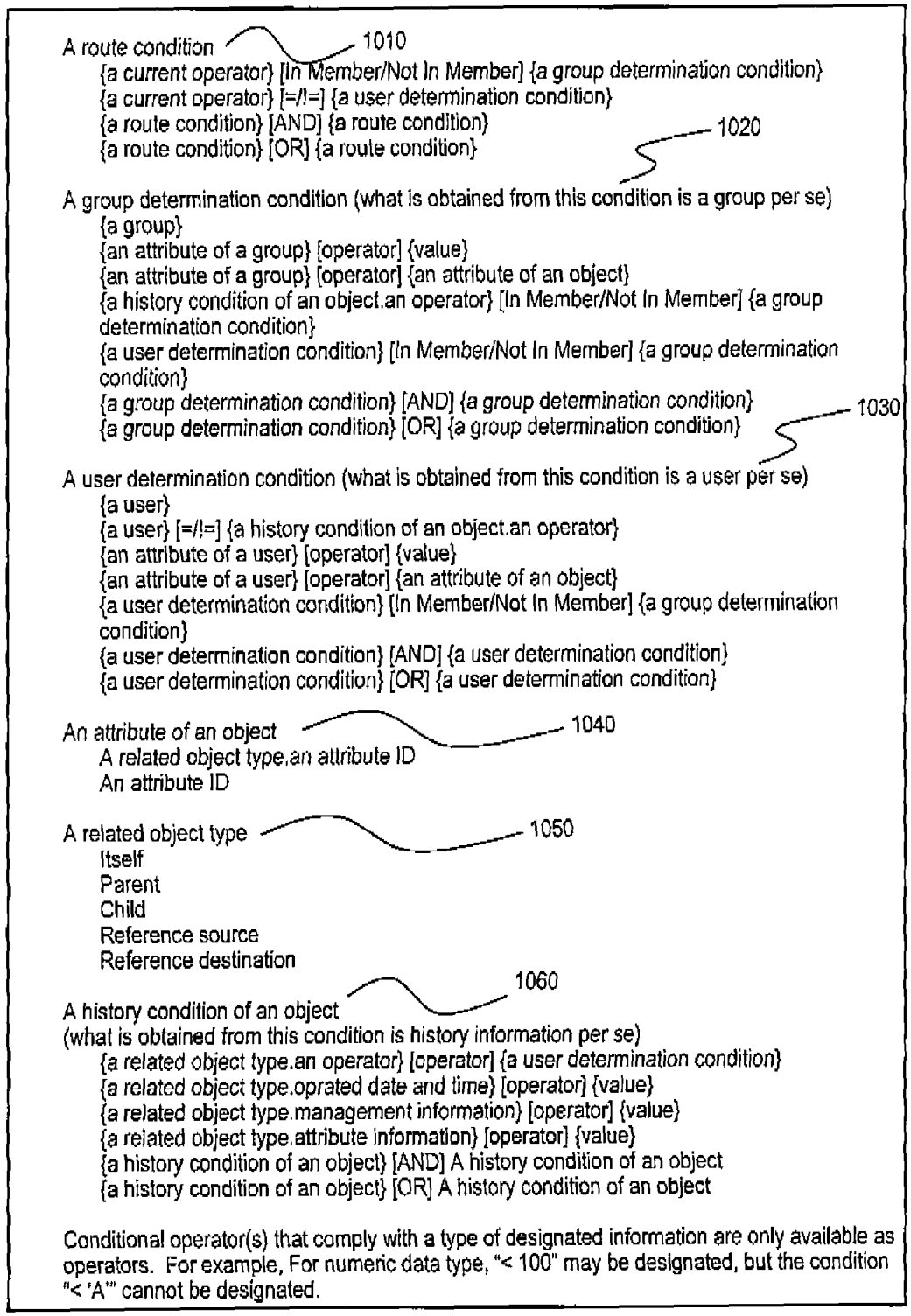
FIG. 10 is a schematic representation showing an example of a condition configuration of virtual roles.

FIG. 10 is a schematic representation showing condition configuration examples of a virtual role. These condition configuration examples of virtual roles include a root condition 1010, a group determination condition 1020 for determining a group, a user determination condition 1030 for determining a user, an object attribute 1040, a relevant object type 1050, an object history condition 1060 for determining a history, and the like.

For example, a form in the first row of the root condition 1010

{a group determination condition} [IN MEMBER]/[NOT IN MEMBER] {a current operator} indicates a form that is used to generate a conditional expression representing that a "current operator" is a member who belongs to a group determined by a "group determination condition" (see the group determination condition 1020) (In Member) or a member who does not belong to the determined group (Not In Member). It is noted that what is described between square brackets ("[" and "]"), such as In Member and Not In Member in the above example, represents an operator and that what is described between curly brackets ("{" and "}"), such as "a current operator" and a "group determination condition" in the above example, represents an element or a value. Also, in this exemplary embodiment, conditional expressions are described in the form of "element+operator+value". For example, in the above example, "current operator" is an identifier of an element, "In Member" ("Not In Member") is an operator, and "group determination condition" is a value.

Also, a form in the second row of the root condition 1010

{a user determination condition} [=]/[!=] {a current operator} indicates a form that is used to generate a conditional expression representing that a "current operator" is a user determined by a "user determination condition" (see the group determination condition 1030) (in the case of [=]) or a user who is not the determined user (in the case of [!=]).

In the following description of this exemplary embodiment, conditional expressions basically have the structure of {USER} [=] {a current operator} or the structure of {GROUP} [IN MEMBER] {a current operator}. If the conditional expression having such a basic structure is true, that is, if {USER} [=] {a current operator} is true or if {a current operator or the structure of {GROUP} [IN MEMBER] {a current operator} is true, the current operation is permitted to access in this exemplary embodiment; otherwise, the current operator's access is denied. For example, the conditional expression "{Document.parent.operationUser} [=] {currentOperator}" represents whether or not a current operator is an operation user of a parent of a document.

It is noted that "USER" and "GROUP" in the above basic structures represent a user determination condition and a group determination condition, respectively, and that "{USER} [=] {a current operator}" represents the condition that a current operator is identical with or is included in a user determined by a user determination condition (USER).

If conditions are combined, it is possible to set the following relatively complex condition as a virtual role:

{GROUP({Document.productName} [IN]
{groupDef.productName})} [IN
MEMBER] {a current operator} [AND]
USER({HISTORY({ObjectHistory.operationDate}
[<] {1 month} [AND]
{ObjectHistory.operation} [=]
{Update}).operationUser})[!=]{a current operator} [AND]
USER({userDef.creationDate} [<] ({nowDate}
[−] {1 month})) [=] {a current operator}

It is noted that the operator "!=" means "≠". Also, the symbol "." (period) is a delimiter that is used to represent what information in interests includes. For example, "{RelatedObjectType.operator}" represents information of a user which is stored as information about an operator of an object determined by a related object type (RelatedObjectType). Also, the expressions "USER( )", "GROUP( )" and "HISTORY( )" represent typecasting. Specifically, USER({HISTORY.operationUser}) changes a data type of "operationUser" (which represents an operation user) set in a history into a user type. Also, USER({GROUP.manager}) changes a data type of a manager set in a group into a user type. "GROUP( )" and "HISTORY( )" also change a data type into a group type and a history type, respectively.

Also, in this exemplary embodiment, {a current operator} is always located in the right side of a conditional expression. However, {a current operator} may be located in the left side of a conditional expression. For example, if {a current operator} in the above exemplary conditional expression is located in the left side thereof, it can be described as follows:

{USER({a currentoperator}).creationDate} [<] ({nowDate} [−] {1 month})

Next, as a specific example, a process according to the above exemplary embodiment that is performed when a product that a user takes charge is changed will be described. More specifically, the condition that an operation, that is requested by a user who is an operation request source and is received by the operation request receiving module 110, of a document was executed within a predetermined period (for example, within 1 month) from the present time is adopted as a predetermined condition that is used when the operation history determination module 122 makes a determination.

As in the example shown in FIG. 9, it is assumed that a user A previously took charge of a product A, and then a user B has taken charge of the product A and the user A has not been in charge of the product A. The following operation is also assumed. That is, if the user A executed some operation of a document used in the product A one month or shorter before the present time, the user A is allowed to update the document as the predecessor.

When a product that a user takes charge of is changed, an attribute value concerning the user (e.g., a name of the product that the user is in charge of) is changed as in the example shown in FIG. 9.

At this time, it is assumed that an access right to a document used in the product A is set as follows:

(A1) Access right type: Tentative access right
(A2) Approver: Person in charge (virtual role)
(A3) Authority: Predecessor (virtual role): Approval is requested
(A4) Authority: Member of group in charge (virtual role): Update is permitted
(A5) Authority: Others: Update is not permitted A virtual role of the person in charge in (A2) will be described. The virtual role of the person in charge is specified by the condition that "a user who has a value of a product name attribute of a target document in a product name attribute of the user". This condition is represented by the following conditional expression:

{USER(Object.productName [IN] userDef.productName)} [=] {a current operator}

The conditional expression "{A} [IN] {B}" means that A is included in B. Also, "productName" is one of attributes of a product. Each product may have various attributes, such as a product name ("productName"), a product number and manufacturing date and a lot number. "Object.productName" represents a product name of an object. Also, "userDef.productName" represents a product name that is set in attributes of a user (that is, a product name attribute of a user).

When this condition is stored in the virtual role information storage table 1200 and the virtual role condition storage table 1300 of the virtual role storage module 250, this condition is stored in the tables in a manner shown in the row having vRoleID (virtual role identifier) 200001.

Next, a virtual role of the predecessor in (A3) will be described. The virtual role of the predecessor is specified by the condition that "a user who is indicated by an operation history of a target document as a user updating the target document one month or shorter before the present time and who does not have a value of a product name attribute of the target document in a product name attribute of the user". This condition is represented by the following conditional expression:

{USER({HISTORY({ObjectHistory.operationDate} [>] ({nowDate} [−] {1 month}) [AND] {ObjectHistory.operationUser} [=] {a current operator}}).operationUser})} [=] {a current operator} [AND] {USER({Object.productName} [NOT IN] {userDef.productName})} [=] {a current operator}

The conditional expression "{A} [NOT IN] {B}" means that A is not included in B. Also, "ObjectHistory.operationDate" represents operation date that is recorded in a history of an object, "nowDate" represents current date, "ObjectHistory.operationUser" represents a user, who operated an object and is recorded in a history of an object, and "HISTORY.operationUser" represents an operation user who is recorded in a history extracted by HISTORY( ).

If this condition is stored in the virtual role information storage table 1200 and the virtual role condition storage table 1300 of the virtual role storage module 250, this condition is stored in the table in a manner shown in the row having vRoleID 200002.

Next, a virtual role of a member of a group in charge in (A4) will be described. The virtual role of the member of the group in charge is specified by the condition that "a member of a group to which a user who has a value of a product name attribute of a target document in a product name attribute of the user belongs". This condition is represented by the following conditional expression:

{USER({GROUP({GROUP} [IN MEMBER] {USER({Document.productName} [IN] {userDef.productName})}}).manager})} [=] {a current operator}

If this condition is stored in the virtual role information storage table 1200, the virtual role condition storage table 1300 of the virtual role storage module 250, it is stored in the table in a manner shown in the row with vRoleID 200004.

If the above tentative access right is preset, when the user A attempts to update the document that user B takes charge of, the flowchart of FIG. 5 determines that the user A is the predecessor, and the tentative update process is performed. Evaluation of the virtual role is executed in accordance with the flowchart of FIG. 6.

Each member of the group to which the person in charge belongs also corresponds to the virtual role of the member of the group in charge and can update.

Since the approver is allowed to update by default, the user B corresponding to the virtual role of the person in charge can update.

Next, as a specific example, a process according to the above exemplary embodiment that is performed when the number of members of a group is increased or decreased will be described. More specifically, the condition that (i) an operation, that is requested by a user who is an operation request source and is received by the operation request receiving module 110, of a document has not been executed within a predetermined first period (e.g. within one month) from the present time and that (ii) the user who is the operation request source has been given an access right within a predetermined second period (which is independent of the first period and may be different or equal to the first period; for example, one month) is adopted as a predetermined condition that is used when the operation history determined module 122 makes a determination.

As in the example shown in FIG. 9, it is assumed that a user A who was a member of a group A was in charge of a product A and then moved from the group A to another group (the user A has not been a member of the group A) and a user B was added to the group A as a new member. The following operation is also assumed. That is, if the user A updated a document within one month or shorter before the present time, the user A is allowed to update the document as the predecessor, and a user (the user B) who has not referred more than one month before the present time is not permitted to update unless the update operation is approved.

At this time, it is assumed that an access right to a document is set as follows:

(B1) Access right type: Tentative access right
(B2) Approver: Person responsible for a group in charge (virtual role)
(B3) Authority: Member of the group in charge (virtual role): Update is permitted
(B4) Authority: New member of the group in charge (virtual role):
Approval is required
(B5) Authority: Old member of the group in charge (virtual role):
Approval is required
(B6) Authority: Others: Update is not permitted The virtual role of the person responsible for the group in charge in (B2) will be described. The virtual role of the person responsible for the group in charge is specified by the condition that "a user who has a value of a product name attribute of a target document in a product name attribute of the user and who is set to a responsible person attribute of a group to which the user belongs". This condition is expressed by the following conditional expression:

{USER(GROUP({Group} [IN MEMBER] {User(Object.productName [IN] UserDef.productName)}).manager)} [=] {a current operator}

If this condition is stored in the virtual role information storage table 1200 and the virtual role condition storage table 1300 of the virtual role storage module 250, this condition is stored in the table in a manner shown in the row having vRoleID 200003.

Next, a virtual role of a member of a group in charge in (B3) will be described. The virtual role of the member of the group in charge is specified by the condition that "a user who is a member of a group containing a user(s) having a value of a product name attribute of a target document in a product name attribute of the user(s)". This condition is represented by the following conditional expression:

{GROUP({Group} [IN MEMBER] USER(Obect.productName [IN] userDef.productName))} [IN MEMBER] {a current operator}

If this condition is stored in the virtual role information storage table 1200 and the virtual role condition storage table 1300 of the virtual role storage module 250, this condition is stored in the table in a manner shown in the row having vRoleID 200002.

Next, a virtual role of a new member of a group in charge in (B4) will be described. The virtual role of the new member of the group in charge is specified by the condition that "a user who is a member of a group containing a user(s) having a value of a product name attribute of a target document in a product name attribute of the user(s) and who has no record of an operation that was performed more than one month before the present time in an operation history of the target document". This condition is represented by the following conditional expression:

{GROUP(Group [IN MEMBER] USER(Object.productName [IN] userDef.productName))} [IN MEMBER] {a current operator}
[AND]
{USER({HISTORY({ObjectHistory.operationDate} [<] ({nowDate} [-] {1 month}).operationUser) [AND] {ObjectHistory.operationUser} [=] {a current operator}}).operationUser})} [!=] {a current operator}

If this condition is stored in the virtual role information storage table 1200 and the virtual role condition storage table 1300 of the virtual role storage module 250, this condition is stored in the table in a manner shown in the row having vRoleID 200005.

Next, a virtual role of an old member of a group in charge in (B5) will be described. The virtual role of the old member of the group in charge is specified by the condition that "a user who is not a member of a group containing a user(s) having a value of a product name attribute of a target document in a product name attribute of the user(s) and who has no record of an operation that is performed within one month from the present time in an operation history of the target document". This condition is represented by the following conditional expression:

{GROUP({Group} [IN MEMBER] USER(Object.productName [IN] userDef.productName))} [NOT IN MEMBER] {a current operator}
[AND]
{USER(HISTORY({ObjectHistory.operationDate} [>] ({nowDate} [-] {1 month}[AND] {ObjectHistory.operationUser} [=] {a current operator})).operationUser)} [=] {a current operator}

If this condition is stored in the virtual role information storage table 1200 and the virtual role condition storage table 1300 of the virtual role storage module 250, this condition is stored in the table in a manner shown in the row having vRoleID 200006.

If the above tentative access right is preset, when the user A moved from the group A attempts to update the document that members of the group A take charge of, the flowchart of FIG. 5 determines that the user A is an old member of the group in charge, and the tentative update process is performed.

Also, the user B has no record of an operation that is performed more than one ago in the history. Thus, the user B falls under the virtual role of a new member of the group in charge, and the tentative update process is performed. If one month has elapsed, an operation record is detected as a history of an operation that was performed more than one month ago. Thus, the user B is treated in the same manner as the other members of the group in charge, and is allowed to update.

Next, as a specific example, a processing according to the above exemplary embodiment that is performed when access evaluation is conducted using information of a high-level folder will be described. More specifically, the condition that an operation of a fold storing a document, on which a user who is an operation request source requests an operation that is received by the operation request receiving module 110, was executed within a predetermined period (e.g., within one month) is adopted as a predetermined condition that is used when the operation history determination module 122 makes a determination.

It is assumed that a user who performed some operation of a parent folder of a folder to which a document belongs within one month from the present time is permitted to reference the document as a person in charge of the high-level folder even if the user does not belong to a group in charge.

At this time, it is assumed that an access right to the document is set as follows:
  (C1) Access right type: Access right
  (C2) Authority: Member of group in charge (virtual role): Update is permitted
  (C3) Authority: Person in charge of high-level folder (virtual role): Reference is permitted A virtual role of a member of a group in charge in (C2) will be described. The virtual role of the member of the group in charge is specified by the condition that "a user is a member of a group containing a user(s) having a value of a product name attribute of a target document in a product name attribute of the user(s)". This condition is represented by the following conditional expression:

{GROUP({Group} [IN MEMBER] USER(Object.productName [IN] userDef.productName))} [IN MEMBER] {a current operator}

If this condition is stored in the virtual role information storage table 1200 and the virtual role condition storage table 1300 of the virtual role storage module 250, this condition is stored in the table in a manner shown in the row having vRoleID 200002.

Next, a virtual role of a person in charge of a high-level folder in (C3) will be described. The virtual role of the person in charge of the high-level folder is specified by the condition that "a user has a record of operating a folder that is a parent of a parent folder of a target document within one month from the present time in an operation history". This condition is represented by the following conditional expression:

{USER(HISTORY(OBJECT(OBJECT(Object.parent).parent).-ObjectHistory.operationDate [>] ({nowDate} [-] {1 month})).operationUSER)} [=] {a current operator}
[AND]
{OBJECT(OBJECT(Object.parent).parent).ObjectHistory.operationUser} [=] {a current operator}

If this condition is stored in the virtual role information storage table 1200 and the virtual role condition storage table 1300 of the virtual role storage module 250, this condition is stored in the table in a manner shown in the row having vRoleID 200007.

If the above access right is preset, the following operation can be performed. That is, even the user in charge of the parent of the parent folder can reference the target document without a group(s) in charge of a high level folder(s) being included in the settings of the access right to the target document and the access right to its parent folder.

<Tentative Access (Tentative Update) Process>

Next, a tentative access (tentative update) process will be described. The tentative access process is separated into the tentative update process and an approval process.

If a user who operates a document only has the tentative access right, the tentative update process holds updated content in the tentative access storage module 420, which is a temporary storage, without updating a formal document (the document in the document information storage module 270).

Figure 14:
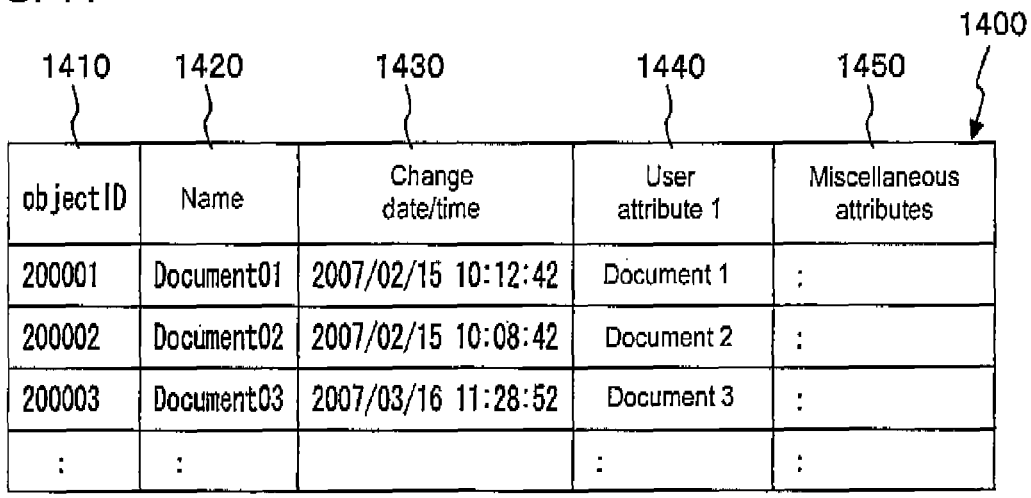
FIG. 14 is a schematic representation showing an example of a data structure of a formal data storage table.

It is assumed that document information is stored in a formal data storage table 1400 of the document information storage module 270, for example, as shown in FIG. 14. FIG. 14 is a schematic representation showing a data structure example of the formal data storage table 1400. The formal data storage table 1400 has an object ID column 1410, a name column 1420, a change date/time column 1430, a user attribute 1 column 1440, and a miscellaneous attribute information column 1450. The object ID column 1410 stores an identifier of each document that is an object. The name column 1420 stores a name of each object. The change date/time column 1430 stores date and time at which each object was operated. The user attribute 1 column 1440 stores an attribute concerning each object. The miscellaneous attribute information column 1450 stores miscellaneous attributes concerning each object.

The user who only has the tentative access right cannot update the formal data storage table 1400. However, the user is permitted to store the updated content temporarily in a different table. This process is called the tentative update process.

For example, when a user 1 who only has the tentative access right tentatively updates an user attribute 1 of Document02 (the user attribute 1 column 1440) in the formal data storage table 1400, all information of Document02 is copied into a tentative update data storage table 1500, which is the different table, and the user 1 updates the tentative update data storage table 1500.

Figure 15:
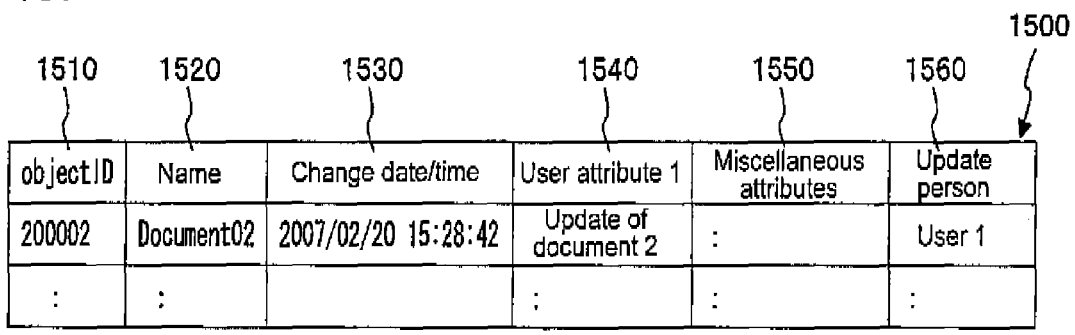
FIG. 15 is a schematic representation showing an example of a data structure of a tentative update data storage table.

The data structure of the tentative update data storage table 1500 for temporarily storing the update can hold the same information as the formal data storage table 1400 for storing the formal data, and holds the updated content (a user attribute 1 column 1540) and the update person (update person column 1560). FIG. 15 is a schematic representation showing a data structure example of the tentative update data storage table 1500. The tentative update data storage table 1500 has an object ID column 1510, a name column 1520, a change date/time column 1530, the user attribute 1 column 1540, a miscellaneous attribute information column 1550, and the update person column 1560. The columns of the object ID column 1510 to the miscellaneous attribute information column 1550 correspond to the columns of the object ID column 1410 to the miscellaneous attribute information column 1450 of the formal data storage table 1400. However, the user attribute 1 column 1540 stores the updated content. The update person column 1560 stores the update user.

Figure 16:
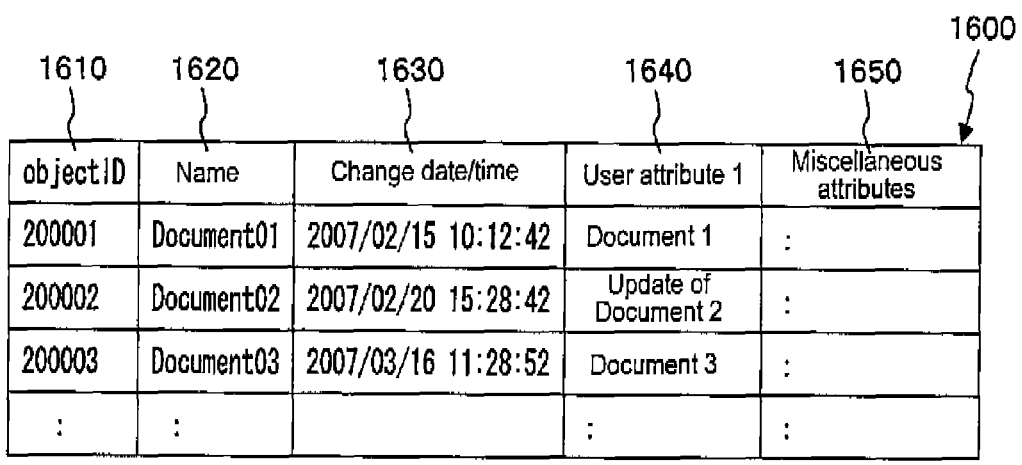
FIG. 16 is a schematic representation showing an example of a data structure of a list result table for a user who makes a tentative update.

At this time, if the user 1 makes a request for presenting a list of documents, a list of documents is presented like a list result table 1600 for the user who makes the tentative update as shown in FIG. 16. However, the result like the formal data storage table 1400 only including the formal data shown in FIG. 14 is presented to the other users. FIG. 16 is a schematic representation showing a data structure example of the list result table 1600 for the user who makes the tentative update. The list result table 1600 for the user who makes the tentative update has an object ID column 1610, a name column 1620, a change date/time column 1630, a user attribute 1 column 1640, and a miscellaneous attribute information column 1650. The list result table 1600 for the user who makes the tentative update has the same structure as the formal data storage table 1400. However, the tables differs in contents between the user who performs the tentative update process and the user who does not perform the tentative update process or between the users who perform the tentative update process.

The approval process is implemented by reflecting the contents held in the tentative update data storage table 1500 on the formal data storage table 1400 and deleting the contents stored in the tentative update data storage table 1500 when the setup approver checks contents of the tentative update process and performs an approval operation.

Figure 17:
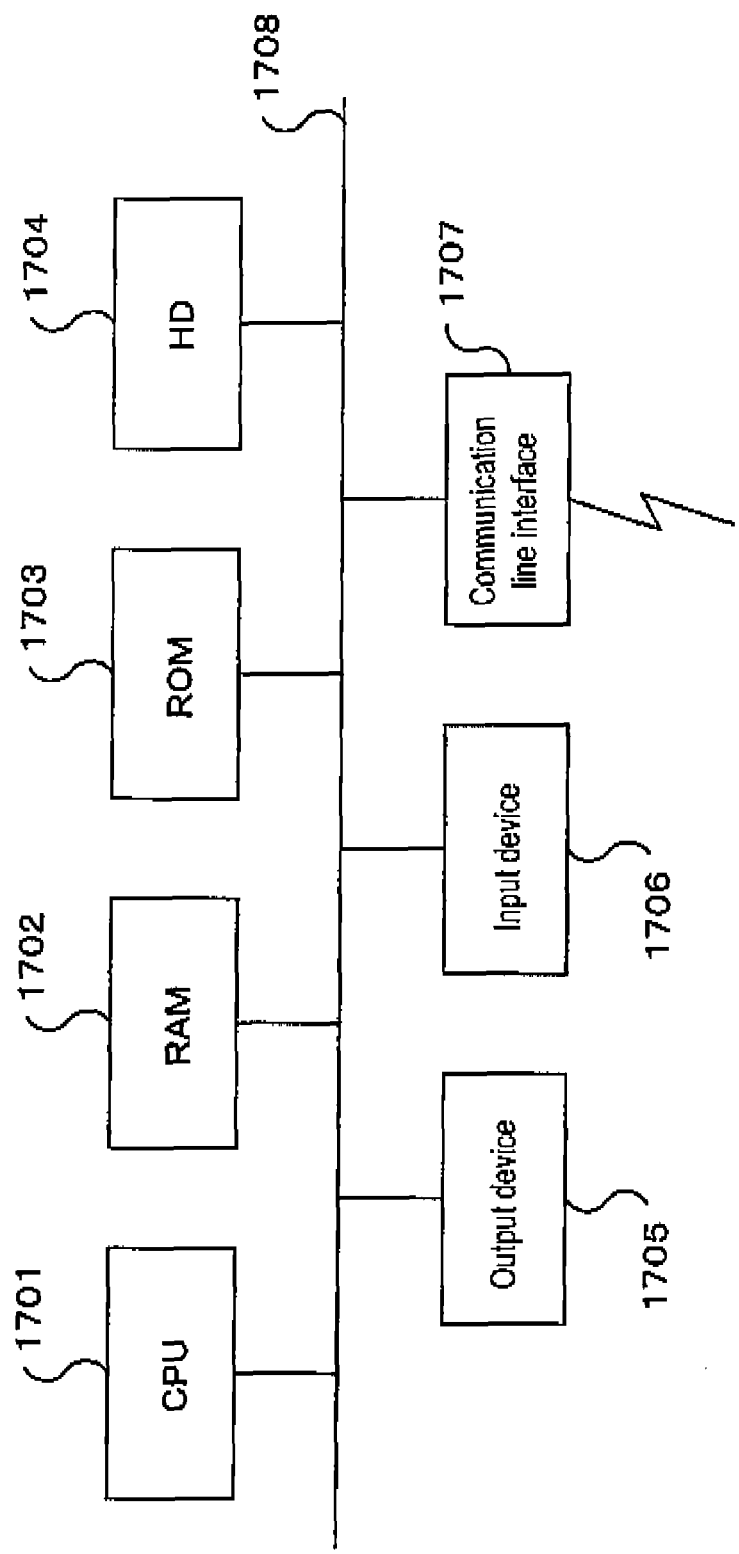
FIG. 17 is a block diagram showing a hardware configuration example of a computer for implementing the exemplary embodiment of the invention.

The hardware configuration of a computer for executing a program as the exemplary embodiment is a general computer as illustrated in FIG. 17; specifically it is a personal computer, a computer that can become a server, or the like. That is, as a specific example, a CPU 1701 is used as a processing section (computation section) and RAM 1702, ROM 1703, and an HD 1704 (for example, a hard disk can be used) are used as storage. The hardware configuration is made up of the CPU 1701 for executing the programs of the operation request receiving module 110, the right/operation processing module 120, the user information storage module 130, the operation history storage module 140, the electronic information storage module 150, the operation processing module 210, the update processing module 220, the access evaluation module 230, the virtual role processing module 240, the tentative access processing module 410, etc., the RAM 1702 for storing the programs and data, the ROM 1703 storing a program for starting the computer and the like, the HD 1104 of auxiliary storage, an input device 1706 for entering data, such as a keyboard or a mouse, an output device 1705 of a CRT, a liquid crystal display, etc., a communication line interface 1707 for connecting to a communication network (for example, a network interface card can be used), and a bus 1708 for connecting the components for transferring data. Two or more computers may be connected by a network.

For the part based on the computer program in the exemplary embodiment described above, the computer program of software is read into the system of the hardware configuration and the software and hardware resources work in cooperation, thereby implementing the exemplary embodiment described above.

The hardware configuration shown in FIG. 17 shows one configuration example and the exemplary embodiment is not limited to the configuration in FIG. 17 and any configuration may be adopted if it makes it possible to execute the modules described in the exemplary embodiment. For example, some modules may be implemented as dedicated hardware (for example, an ASIC, etc.) and some modules may be included in an external system and may be connected via a communication line and further a plurality of systems shown in FIG. 17 may be connected via a communication line so as to operate in cooperation with each other. The system may be built in a home information appliance, a copier, a fax, a scanner, a printer, a multiple function processing machine (an image processing apparatus having functions of any two or more of a scanner, a printer, a copier, a fax, etc.) etc., in addition to a personal computer.

In the exemplary embodiment described above, "present" includes print on a printer, etc., output of a sound to a sound output unit of a loudspeaker, etc., as well as display on the display, etc., and may be a combination thereof.

The described program may be provided as it is stored on a record medium or the program may be provided by communication means. In this case, for example, the described program may be grasped as the invention of a computer-readable record medium recording a program."

The expression "computer-readable record medium recording a program" is used to mean a record medium read by a computer recording a program, used to install and execute a program, to distribute a program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), blue-ray disk, magneto-optical disk (MO), flexible disk (FD), magnetic tape, hard disk, read-only memory (ROM), electrically erasable and programmable read-only memory (EEPROM), flash memory, random access memory (RAM), etc., for example.

The described program or a part thereof may be recorded in any of the described record media for retention, distribution, etc. The described program or a part thereof may be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and may be carried over a carrier wave.

Further, the described program may be a part of another program or may be recorded in a record medium together with a different program. It may be recorded as it is divided into a plurality of record media. It may be recorded in any mode if it can be restored, such as compression or encryption.

What is claimed is:

1. An information management method comprising:
   receiving a request in an operation request receiving unit for a certain operation of certain electronic information associated with operation right information that defines a permitted operation for each user;
   determining in a first control unit, based on the operation right associated with the certain electronic information, whether or not it is permitted for a user who is a request source of the certain operation to execute the certain operation in an operation executing unit;
   if it is determined in the first control unit that the user is permitted to execute the certain operation, starting to execute the certain operation in the operation executing unit;
   determining in a second control unit whether or not at least one of (i) a history of previous operations, executed by the user, of the certain electronic information and (ii) a history of previous operations, executed by the user, of a location associated with the certain electronic information meets a predetermined condition, the predetermined condition including at least one of a condition that the user who is the request source of the certain operation operated the certain electronic information within a first time period before the present time period, and a condition that the user who is the request source of the certain operation operated the location associated with the certain electronic information within a second time period before the present time period; and
   if it is determined in the second control unit that the at least one of (i) the history of previous operations, executed by the user, of the certain electronic information and (ii) the history of previous operations, executed by the user, of the location associated with the certain electronic information meets the predetermined condition, starting to execute the certain operation in the operation executing unit,
   wherein at least one of the operation request receiving unit, the first control unit, the operation executing unit, and the second control unit are implemented with a processor.

2. The method according to claim 1, further comprising:
   if the certain operation is executed, storing in the history of the previous operations of the certain electronic information, operation history information indicating that the certain operation has been executed for the certain electronic information.

3. The method according to claim 1, further comprising:
   switching between permitting and non-permitting the at least one of (i) the history of the previous operations, executed by the user, of the certain electronic information and (ii) the history of the previous operations, executed by the user, of the location associated with the certain electronic information meets the predetermined condition.

4. The method according to claim 1, wherein
   the certain electronic information, which is an operation target, is an element constituting a tree structure, and
   if a history of previous operations, executed by the user who is the request source of the certain operation, of electronic information that is located in an ancestor node of the tree structure with respect to the certain electronic information meets the predetermined condition, it is started to execute the certain operation.

5. The method according to claim 4, wherein the tree structure is a structure in which the certain electronic information is contained in a folder.

6. The method according to claim 1, wherein
   the execution of the certain operation includes
   making a copy of the certain electronic information,
   executing the certain operation for the copy of the certain electronic information,
   inquiring of a user who has an authorization right to authorize the execution of the certain operation for the certain electronic information, and
   if the user who has the authorization right authorizes the execution of the certain operation for the certain electronic information, updating the electronic certain information based on the copy of the certain electronic information for which the certain operation has been executed.

7. The method according to claim 1, wherein
   the predetermined condition includes a condition that the user who is the request source of the certain operation has not operated the certain electronic information or the location associated with the certain electronic information within the first time period before present and that the operation right was given to the user who is the request source of the certain operation within a second time period from present.

8. The method according to claim 1, wherein the location associated with the certain electronic information is a folder or a directory used to classify documents.

9. An information management system comprising:
an operation request receiving unit;
an operation execution unit;
a history storage unit that stores operation history information indicating at least one of (i) a history of previous operations, executed by the operation execution unit, of electronic information and (ii) a history of previous operations, executed by the operation execution unit, of locations each of which is associated with corresponding electronic information;
a first control unit; and
a second control unit, wherein
when the operation request receiving unit receives a request for a certain operation of certain electronic information associated with operation right information that defines a permitted operation for each user,
the first control unit determines, based on the operation right associated with the certain electronic information, whether or not it is permitted for a user who is a request source of the certain operation to execute the certain operation, and
the second control unit determines whether or not at least one of (i) a history of previous operations, executed by the user and indicated by the operation history information, of the certain electronic information and (ii) a history of previous operations, executed by the user and indicated by the operation history information, of a location associated with the certain electronic information meets a predetermined condition, the predetermined condition includes at least one of a condition that the user who is the request source of the certain operation operated the certain electronic information within a predetermined time period before the present time period, and a condition that the user who is the request source of the certain operation operated the location associated with the certain electronic information within the predetermined time period before the present time period,
if the first control unit determines that the user is permitted to execute the certain operation, the first control unit causes the operation execution unit to start to execute the certain operation, and
if the second control unit determines that the at least one of (i) the history of previous operations, executed by the user, of the certain electronic information and (ii) the history of previous operations, executed by the user, of the location associated with the certain electronic information meets the predetermined condition, the second control unit causes the operation execution unit to start to execute the certain operation.

10. The method according to claim 9, further comprising:
a switching unit that switches between enablement and disablement of the second control unit.

11. The system according to claim 9, wherein
the certain electronic information, which is an operation target, is an element constituting a tree structure, and
if a history of previous operations, executed by the user who is the request source of the certain operation, of electronic information that is located in an ancestor node of the tree structure with respect to the certain electronic information meets the predetermined condition, the second control unit causes the operation execution unit to start to execute the certain operation.

12. The system according to claim 9, further comprising:
an inquiry unit, wherein
when the operation execution unit is to execute the certain operation,
the operation execution unit makes a copy of the certain electronic information and executes the certain operation for the copy of the certain electronic information,
the inquiry unit inquires of a user who has an authorization right to authorize the execution of the certain operation for the certain electronic information, and
if the user who has the authorization right authorizes the execution of the certain operation for the certain electronic information, the operation execution unit updates the electronic certain information based on the copy of the certain electronic information for which the certain operation has been executed.

13. The system according to claim 9, wherein
the predetermined condition includes a condition that the user who is the request source of the certain operation has not operated the certain electronic information or the location associated with the certain electronic information within the first time period before present and that the operation right was given to the user who is the request source of the certain operation within a second time period from present.

14. A non-transitory computer-readable medium storing a program that causes a computer to execute an information management process, the information management process comprising:
receiving a request for certain operation of a certain electronic information associated with operation right information that defines a permitted operation for each user;
determining, based on the operation right associated with the certain electronic information, whether or not it is permitted for a user who is a request source of the certain operation to execute the certain operation;
if it is determined that the user is permitted to execute the certain operation, starting to execute the certain operation;
determining whether or not at least one of (i) a history of previous operations, executed by the user, of the certain electronic information and (ii) a history of previous operations, executed by the user, of a location associated with the certain electronic information meets a predetermined condition, the predetermined condition includes at least one of a condition that the user who is the request source of the certain operation operated the certain electronic information within a predetermined time period before the present time period, and a condition that the user who is the request source of the certain operation operated the location associated with the certain electronic information within the predetermined time period before the present time period; and
if it is determined that the at least one of (i) the history of previous operations, executed by the user, of the certain electronic information and (ii) the history of previous operations, executed by the user, of the location associated with the certain electronic information meets the predetermined condition, starting to execute the certain operation.

15. The non-transitory computer-readable medium according to claim 14, wherein
if the certain operation is executed, storing in the history of the previous operations of the certain electronic information, operation history information indicating that the certain operation has been executed for the certain electronic information.

16. The non-transitory computer-readable medium according to claim 14, wherein the information management process further comprises switching between permitting and non-permitting of the at least one of (i) the history of the previous operations, executed by the user, of the certain electronic information and (ii) the history of the previous operations, executed by the user, of the location associated with the certain electronic information meets the predetermined condition.

17. The non-transitory computer-readable medium according to claim 14, wherein the certain electronic information, which is an operation target, is an element constituting a tree structure, and if a history of previous operations, executed by the user who is the request source of the certain operation, of electronic information that is located in an ancestor node of the tree structure with respect to the certain electronic information meets the predetermined condition, it is started to execute the certain operation.

18. The non-transitory computer-readable medium according to claim 14, wherein the execution of the certain operation includes making a copy of the certain electronic information, executing the certain operation for the copy of the certain electronic information, inquiring of a user who has an authorization right to authorize the execution of the certain operation for the certain electronic information, and if the user who has the authorization right authorizes the execution of the certain operation for the certain electronic information, updating the electronic certain information based on the copy of the certain electronic information for which the certain operation has been executed.

19. The non-transitory computer-readable medium according to claim 14, wherein the predetermined condition includes a condition that the user who is the request source of the certain operation has not operated the certain electronic information or the location associated with the certain electronic information within the first time period before present and that the operation right was given to the user who is the request source of the certain operation within a second time period from present.

20. An information management system comprising;

an operation request receiving unit that receives a request for certain operation of certain electronic information associated with operation right information that defines permitted operation for each user;

an operation execution unit that executes a given operation to the certain electronic information or location information indicating location which is associated with the certain electronic information;

a history storage unit that stores operation history information indicating at least one of (i) a history of previous operation, executed by the operation execution unit, of electronic information or (a) a history of previous operation, executed by the operation execution unit, of the location information which is associated with corresponding electronic information;

a first control unit that, when the operation request receiving unit receives the request for certain operation of the certain electronic information, based on the operation right associated with the certain electronic information, determines as to whether or not it is permitted for a user who is a request source of the certain operation to execute the certain operation; and a second control unit determines as to whether or not at least one of (i) a history of previous operation, executed by the operation execution unit, of electronic information and (fi) a history of previous operation, executed by the operation execution unit, of locations each of which is associated with corresponding electronic information, meets a predetermined condition, wherein if the first control unit determines that the user is permitted to execute the certain operation, the first control unit causes the operation execution unit to start to execute the certain operation, if the first control unit determines that (a) the user is permitted to execute the certain operation, (b) an operation that is requested by the user who is an operation request source, received by the operation request receiving unit, and is directed to the certain electronic information or location information indicating location which is associated with the certain electronic information, is not within a first period from present time, and (c) the user who is the operation request source has been given an operation right within a second period from the present time, the first control unit causes the operation execution unit to start to execute the certain operation and causes the certain operation to be approved by the other user, and if the second control unit determines that the at least one of (i) a history of previous operation, executed by the operation execution unit, of electronic information and (ii) a history of previous operation, executed by the operation execution unit, of locations each of which is associated with corresponding electronic information, meets a predetermined condition, the second control unit causes the operation execution unit to start to execute the certain operation.

* * * * *